(12) United States Patent
He et al.

(10) Patent No.: US 11,937,168 B2
(45) Date of Patent: Mar. 19, 2024

(54) METHOD AND APPARATUS FOR SESSION MANAGEMENT

(71) Applicant: Telefonaktiebolaget LM Ericsson (publ), Stockholm (SE)

(72) Inventors: Yingjiao He, Shanghai (CN); Jinyin Zhu, Shanghai (CN); Yongzhong Liang, Nanjing (CN)

(73) Assignee: Telefonaktiebolagget LM Ericsson (Publ), Stockholm (SE)

(*) Notice: Subject to any disclaimer, the term of this patent is extended or adjusted under 35 U.S.C. 154(b) by 287 days.

(21) Appl. No.: 17/417,458

(22) PCT Filed: Jan. 3, 2019

(86) PCT No.: PCT/CN2019/070220
§ 371 (c)(1),
(2) Date: Jun. 23, 2021

(87) PCT Pub. No.: WO2020/140226
PCT Pub. Date: Jul. 9, 2020

(65) Prior Publication Data
US 2022/0070757 A1    Mar. 3, 2022

(51) Int. Cl.
*H04W 40/28* (2009.01)
*H04L 45/00* (2022.01)
(Continued)

(52) U.S. Cl.
CPC ............ *H04W 40/28* (2013.01); *H04L 45/22* (2013.01); *H04L 45/28* (2013.01); *H04L 67/145* (2013.01);
(Continued)

(58) Field of Classification Search
None
See application file for complete search history.

(56) References Cited

U.S. PATENT DOCUMENTS

| 9,225,706 B2 | 12/2015 | Hoggan |
| 10,021,181 B2 | 7/2018 | Endahl et al. |

(Continued)

FOREIGN PATENT DOCUMENTS

| CN | 105872079 A | 8/2016 |
| CN | 108737262 A | 11/2018 |

(Continued)

OTHER PUBLICATIONS

EPO Communication with Supplementary European Search Report dated Jul. 5, 2022 for Patent Application No. 19907074.9, consisting of 12-pages.

(Continued)

*Primary Examiner* — Rebecca E Song
(74) *Attorney, Agent, or Firm* — Christopher & Weisberg, P.A.

(57) ABSTRACT

Embodiments of the present disclosure provide methods and apparatuses for session management. A method implemented at a first network function (NF) may comprise detecting that a path between the first NF and a second NF is failed or the second NF is failed, wherein the second NF maintains one or more data network connections or sessions established between one or more user equipments (UEs) and one or more data networks; selecting an available second NF for the at least one of the one or more data network connections or sessions; sending at least one address or address range of at least one UE corresponding to the at least one of the one or more data network connections or sessions and respective priority metric of the at least one address or address range to the available second NF.

16 Claims, 13 Drawing Sheets

(51) Int. Cl.
    H04L 45/28      (2022.01)
    H04L 67/145     (2022.01)
    H04W 28/02      (2009.01)
    H04W 36/30      (2009.01)
    H04W 40/24      (2009.01)
(52) U.S. Cl.
    CPC ....... H04W 28/0268 (2013.01); H04W 36/30 (2013.01); H04W 40/248 (2013.01)

(56) References Cited

U.S. PATENT DOCUMENTS

| 2012/0063300 | A1 |   | 3/2012 | Sahin et al. |             |
|---|---|---|---|---|---|
| 2016/0072665 | A1 | * | 3/2016 | Xia ...................... | H04W 76/19 |
|   |   |   |   |   | 370/225 |
| 2020/0053828 | A1 | * | 2/2020 | Bharatia ............... | H04W 76/11 |
| 2020/0099608 | A1 | * | 3/2020 | Raj ......................... | H04L 45/14 |
| 2020/0137663 | A1 | * | 4/2020 | Albasheir ............. | H04W 76/22 |

FOREIGN PATENT DOCUMENTS

| WO |         0152483 A1    | 7/2001  |             |
|---|---|---|---|
| WO | WO-2018145103 A1 *    | 8/2018  | ............. H04L 65/80 |
| WO | WO-2019196811 A1 *    | 10/2019 | ............. H04L 67/14 |

OTHER PUBLICATIONS

3GPP TR 29.844 V1.1.0; 3rd Generation Partnership Project; Technical Specification Group Core Network and Terminals: Study on Control and User Plane Separation of EPC Nodes (Release 14); Apr. 2017, consisting of 52-pages.

3GPP TSG CT4 Meeting #74 C4-164320 (was C4-164274) (Was C4-164090; Title: Pseudo-CR on Solution for PGW-U Failure without Restart—Solution#1; Agenda Item: 6.3.8; Source: Cisco Systems Inc.; Spec: 3GPP TR 29.8de; Document for: Approval; Date and Location: Jul. 25-29, 2016, Tenerife, Spain, consisting of 3-pages.

3GPP, "3GPP TS 23.007 V15.1.0", 3rd Generation Partnership Project; Technical Specification Group Core Network and Terminals; Restoration procedures (Release 15), Sep. 2018, 1-107.

3GPP, "3GPP TS 23.214 V15.3.0", 3rd Generation Partnership Project; Technical Specification Group Services and System Aspects; Architecture enhancements for control and user plane separation of EPC nodes; Stage 2 (Release 15), Jun. 2018, 1-92.

3GPP, "3GPP TS 29.244 V15.3.0", 3rd Generation Partnership Project; Technical Specification Group Core Network and Terminals; Interface between the Control Plane and the User Plane Nodes; Stage 3 (Release 15), Sep. 2018, 1-189.

3GPP, "3rd Generation Partnership Project; Technical Specification Group Services and System Aspects; Procedures for the 5G System; Stage 2 (Release 15)", 3GPP TS 23.502 V15.3.0, Sep. 2018, 1-330.

3GPP, "3rd Generation Partnership Project; Technical Specification Group Services and System Aspects; System Architecture for the 5G System; Stage 2 (Release 15)", 3GPP TS 23.501 V15.3.0, Sep. 2018, 1-226.

\* cited by examiner

METHOD AND APPARATUS FOR SESSION MANAGEMENT

TECHNICAL FIELD

The non-limiting and exemplary embodiments of the present disclosure generally relate to the technical field of communications, and specifically to methods and apparatuses for session management.

BACKGROUND

This section introduces aspects that may facilitate a better understanding of the disclosure. Accordingly, the statements of this section are to be read in this light and are not to be understood as admissions about what is in the prior art or what is not in the prior art.

CUPS (Control User Plane Split) architecture has been defined in 3rd Generation Partnership Project (3GPP) TS23.214, the disclosure of which is incorporated by reference herein in their entirety. With CUPS, a Sxb interface is defined between a packet data network gateway (PGW) control plane (PGW-C) and a PGW user plane (PGW-U), an N4 interface is defined between a Session Management Function (SMF) and a user plane such as User Plane Function (UPF) in 3GPP TS29.244, the disclosure of which is incorporated by reference herein in their entirety.

3GPP TS23.007 introduces some solutions of how to handle a failure of path or network function (NF) in a core network, the disclosure of which is incorporated by reference herein in their entirety.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In a first aspect of the disclosure, there is provided a method implemented at a first network function (NF). The method may comprise detecting that a path between the first NF and a second NF is failed or the second NF is failed, wherein the second NF maintains one or more data network connections or sessions established between one or more user equipments (UEs) and one or more data networks; selecting an available second NF for the at least one of the one or more data network connections or sessions; sending at least one address or address range of at least one UE corresponding to the at least one of the one or more data network connections or sessions and respective priority metric of the at least one address or address range to the available second NF.

In a second aspect of the disclosure, there is provided a method implemented at an available second network function (NF). The method may comprise receiving at least one address or address range of at least one user equipment (UE) corresponding to at least one of one or more data network connections or sessions and respective priority metric of the at least one address or address range from a first NF, wherein a second NF maintains the one or more data network connections or sessions established between one or more UEs and one or more data networks; and notifying the at least one address or address range and the respective priority metric to the one or more data networks.

In a third aspect of the disclosure, there is provided a method implemented at a third network function (NF). The method may comprise receiving a tunnel identifier of an available second NF from the first NF; and sending the tunnel identifier of the available second NF to a fourth NF, wherein the available second NF is selected by the first NF in response to the first NF detecting that a path between the first NF and a second NF is failed or the second NF is failed.

In a fourth aspect of the disclosure, there is provided a method implemented at a fourth network function (NF). The method may comprise receiving a tunnel identifier of an available second NF from a first NF or a third NF, wherein the available second NF is selected for the at least one of the one or more data network connections or sessions by the first NF in response to the first NF detecting that a path between the first NF and a second NF is failed or the second NF is failed; and updating tunnel information to enable the fourth NF to route and/or forward traffic related to the at least one of the one or more data network connections or sessions to the available second NF.

In a fifth aspect of the disclosure, there is provided an apparatus implemented at a first network function (NF). The apparatus may comprise a processor; and a memory coupled to the processor, said memory containing instructions executable by said processor, whereby said apparatus is operative to detect that a path between the first NF and a second NF is failed or the second NF is failed, wherein the second NF maintains one or more data network connections or sessions established between one or more user equipments (UEs) and one or more data networks; select an available second NF for the at least one of the one or more data network connections or sessions; send at least one address or address range of at least one UE corresponding to the at least one of the one or more data network connections or sessions and respective priority metric of the at least one address or address range to the available second NF.

In a sixth aspect of the disclosure, there is provided an apparatus implemented at an available second network function (NF). The apparatus may comprise a processor; and a memory coupled to the processor, said memory containing instructions executable by said processor, whereby said apparatus is operative to receive at least one address or address range of at least one user equipment (UE) corresponding to at least one of one or more data network connections or sessions and respective priority metric of the at least one address or address range from a first NF, wherein a second NF maintains the one or more data network connections or sessions established between one or more UEs and one or more data networks; and notify the at least one address or address range and the respective priority metric to the one or more data networks.

In a seventh aspect of the disclosure, there is provided an apparatus implemented at a third network function (NF). The apparatus may comprise a processor; and a memory coupled to the processor, said memory containing instructions executable by said processor, whereby said apparatus is operative to receive a tunnel identifier of an available second NF from the first NF; and send the tunnel identifier of the available second NF to a fourth NF, wherein the available second NF is selected by the first NF in response to the first NF detecting that a path between the first NF and a second NF is failed or the second NF is failed.

In an eighth aspect of the disclosure, there is provided an apparatus implemented at a fourth network function (NF). The apparatus may comprise a processor; and a memory coupled to the processor, said memory containing instructions executable by said processor, whereby said apparatus is operative to receive a tunnel identifier of an available second NF from a first NF or a third NF, wherein the available second NF is selected for the at least one of the one or more data network connections or sessions by the first NF in response to the first NF detecting that a path between the first NF and a second NF is failed or the second NF is failed; and update tunnel information to enable the fourth NF to route and/or forward traffic related to the at least one of the one or more data network connections or sessions to the available second NF.

In a ninth aspect of the disclosure, there is provided a computer program product storing instructions which, when executed on at least one processor, cause the at least one processor to carry out the method according to the first aspect of the disclosure.

In a tenth aspect of the disclosure, there is provided a computer program product storing instructions which, when executed on at least one processor, cause the at least one processor to carry out the method according to the second aspect of the disclosure.

In an eleventh aspect of the disclosure, there is provided a computer program product storing instructions which, when executed on at least one processor, cause the at least one processor to carry out the method according to the third aspect of the disclosure.

In a twelfth aspect of the disclosure, there is provided a computer program product storing instructions which, when executed on at least one processor, cause the at least one processor to carry out the method according to the fourth aspect of the disclosure.

In a thirteenth aspect of the disclosure, there is provided a computer-readable storage medium storing instructions which, when executed on at least one processor, cause the at least one processor to carry out the method according to the first aspect of the disclosure.

In a fourteenth aspect of the disclosure, there is provided a computer-readable storage medium storing instructions which, when executed on at least one processor, cause the at least one processor to carry out the method according to the second aspect of the disclosure.

In an fifteenth eleventh aspect of the disclosure, there is provided a computer-readable storage medium storing instructions which, when executed on at least one processor, cause the at least one processor to carry out the method according to the third aspect of the disclosure.

In a sixteenth aspect of the disclosure, there is provided a computer-readable storage medium storing instructions which, when executed on at least one processor, cause the at least one processor to carry out the method according to the fourth aspect of the disclosure.

The embodiments of the present disclosure may provide the following advantages. Some embodiments of the present disclosure can provide a simple and efficient method for the second NF such as PGW-U/UPF reselection when a path such as Sx/N4 failure is detected; and low cost to achieve the UP (user plane) redundancy. Some embodiments of the present disclosure can save huge signaling on the radio/core network since the existing solution requires to release the old packet data network (PDN) connection and re-establish the new connection. In some embodiments of the present disclosure, the session and service continuity is kept which may give a good experience to end users. Some embodiments of the present disclosure can provide a user friendly, cost-saving and efficient way to change the second NF such as PGW-U or UPF anchor upon path such as Sxb or N4 failure. In some embodiments of the present disclosure, there is less signaling in the network and less impact on UE's service compared with deleting the PDN connection or packet data unit (PDU) session. Some embodiments of the present disclosure can provide much lower cost compared with UP function level 1+1 redundancy.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
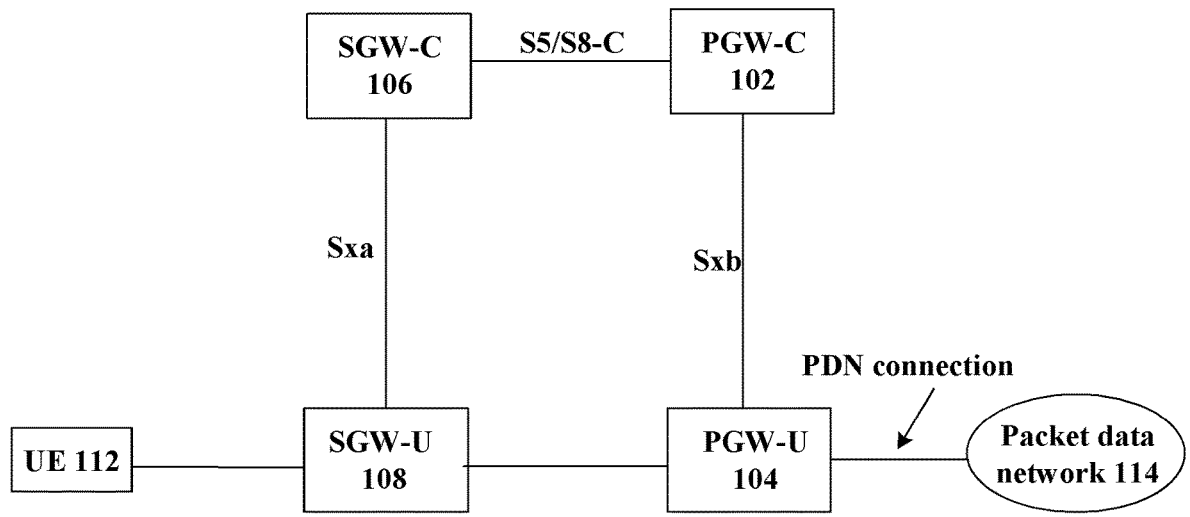
FIG. 1 schematically shows a system according to an embodiment of the present disclosure.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "network" refers to a network following any suitable wireless/wired communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by some of standards organizations such as 3GPP. For example, the communication protocols as defined by 3GPP may comprise the second generation (2G) with S4-SGSN(Service GPRS(General Packet Radio Service) Supporting Node) access, third generation(3G) with S4-SGSN, fourth generation (4G), 4.5G, the fourth generation (5G) communication protocols, and/or any other protocols either currently known or to be developed in the future.

The term "network device" refers to a network device in a communication network via which a terminal device accesses to the network and receives services therefrom. For example, in a wireless communication network such as a 3GPP-type cellular network, the network device may comprise access network device and core network device. For example, the access network device may comprise base station (BS), an Integrated Access and Backhaul (IAB) node, an access point (AP), a multi-cell/multicast coordination entity (MCE), etc. The BS may be, for example, a Radio Network Controller (RNC) with S4-SGSN, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth. The core network device may comprise a plurality of network devices which may offer numerous services to the customers who are interconnected by the access network device. Each access network device is connectable to the core network device over a wired or wireless connection.

The term "network function" refers to any suitable function which can be implemented in a network device of a wireless communication network via which a terminal device can access the network and receives services therefrom. For example, The 2G/3G/4G communication system may comprise a plurality of NFs such as SGW-C, SGW-U, PGW-C, PGW-U, etc. The 5G communication system may comprise a plurality of NFs such as Authentication Server Function (AUSF), Access and Mobility Management Function (AMF), Data Network (DN) (e.g. operator services, Internet access or 3rd party services), Network Exposure Function (NEF), Network Repository Function (NRF), Network Slice Selection Function (NSSF), Policy Control Function (PCF), Session Management Function (SMF), Unified Data Management (UDM), User Plane Function (UPF), Policy Control Function (PCF), Application Function (AF), User Equipment (UE), (Radio) Access Network ((R)AN), etc. In a wireless communication network, the network device may refer to Mobility Management Entity (MME), Serving GateWay (SGW), Packet Data Network GateWay (PGW), Policy and Charging Rules Function (PCRF), Home Subscriber Server (HSS) or any other suitable device in the wireless communication network. It is noted that the network function may comprise different network elements depending on the type of network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, a downlink, DL, transmission refers to a transmission from a network device to a terminal device, and an uplink, UL, transmission refers to a transmission in an opposite direction.

In the following description and claims, unless defined otherwise, all technical and scientific terms used herein have the same meaning as commonly understood by one of ordinary skills in the art to which this disclosure belongs.

Figure 2:
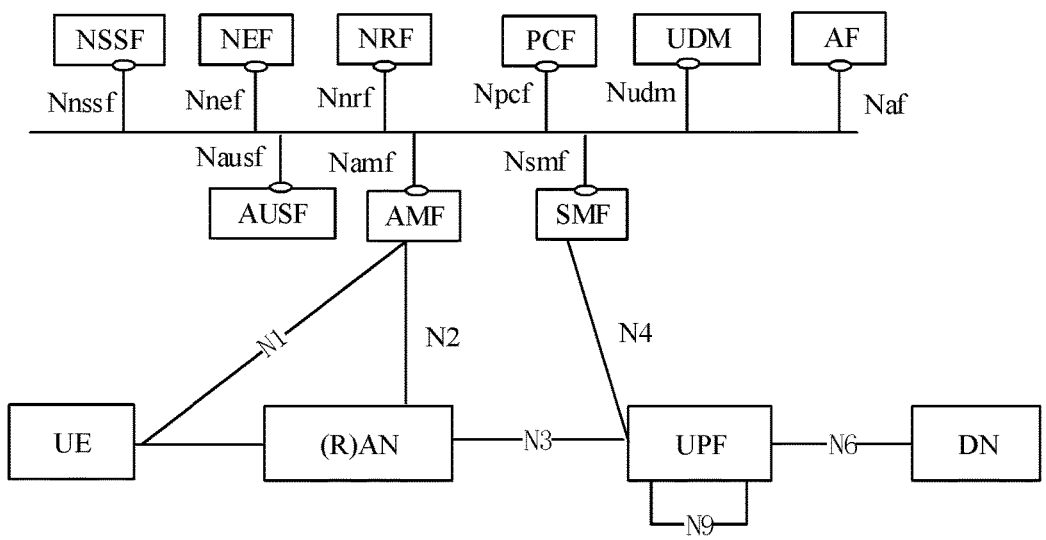
FIG. 2 schematically shows another system according to an embodiment of the present disclosure.

Although the subject matter described herein may be implemented in any appropriate type of system using any suitable components, the embodiments disclosed herein are described in relation to a communication system complied with the exemplary system architecture illustrated in FIG. 1 and FIG. 2.

FIG. 1 schematically shows a system according to an embodiment of the present disclosure. As shown in FIG. 1, the system 100 may comprise a PGW control plane (PGW-C) 102, a PGW user plane (PGW-U) 104, a SGW (serving gateway) control plane (SGW-C) 106, a SGW user plane (SGW-U) 108, a UE 112, a packet data network 114. A PDN connection may be used by the UE 112 to connect to the packet data network 114 through at least the SGW-U 108 and the PGW-U 104. The system 100 may be CUPS architecture as defined in 3GPP TS23.214. With CUPS, Sxb interface is defined between PGW-C and PGW-U, Sxa interface is defined between SGW-C and SGW-U, and S5/S8 interface is defined between PGW-C and SGW-C. This enables flexible network deployment and operation and the independent scaling between control plane and user plane functions while not affecting the functionality of the existing nodes subject to this split. It is noted that there may be multiple UEs though only one UE is shown in the system 100. Each PGW-C may manage/control one or more PGW-Us though only one PGW-U is shown in the system 100. Each SGW-C may manage/control multiple SGW-Us though only one SGW-U is shown in the system 100. Each PGW-C may be connected to one or more SGW-Cs though only one SGW-C is shown in the system 100. Each SGW-C may be connected to one or more PGW-Cs though only one PGW-C is shown in the system 100.

FIG. 2 schematically shows a high level architecture in the next generation network such as 5G. For simplicity, the system architecture of FIG. 2 only depicts some exemplary elements such as AUSF, AMF, DN, NEF, NRF, NSSF, PCF, SMF, UDM, UPF, AF, UE, (R)AN. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

In accordance with an exemplary embodiment, the UE can establish a signaling connection with the AMF over the reference point N1, as illustrated in FIG. 2. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a packet data unit (PDU) session to the DN (data network, e.g. an operator network or Internet) through the UPF over the reference point N6.

As further illustrated in FIG. 2, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 2 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 2 may be responsible for functions such as session management, mobility management, authentication, and security. These may be critical for delivering a service in the network. The AUSF, AMF, DN, NEF, NRF, NSSF, PCF, SMF, UDM, UPF, AF, UE, (R)AN may include the functionality for example as defined in 3GPP TS 23.501 or its future version. For example, the NEF may act as a gateway which can enable external users to monitor, provision and enforce an application policy for users inside the network. The AUSF may be configured as an authentication server. The UDM can store subscriber data and profiles. The PCF can provide a policy framework incorporating network slicing, roaming and mobility management. The AMF can manage access control and mobility. The SMF can set up and manage sessions according to a network policy. The UPF can be deployed in various configurations and locations according to the service type.

When a first NF such as PGW-C/SMF detects a path such as a Sxb and N4 path failure between the first NF and the second NF, there might be the following problems happens: the path such as Sxb/N4 has failed and/or the second NF such as UP node (PGW-U/UPF) has failed.

For the path such as N4/Sxb failure, the 3GPP standard such as 3GPP TS23.007 describes that all the related session contexts and Sxb associations affected by the failure become invalid and may be deleted, that means the approaches can be: either deleting the whole packet data network (PDN) connections by clean up the session, or selecting an alternative UP node which can take over the IP (Internet protocol) address of the failed one to restore the Sxb session as proposed for Sxa path failure in 3GPP TS23.007

For PDN connection deletion, deleting/re-establishing the PDN connection will generate extra huge signaling load to the network, also the deleting/re-establishing introduces more signaling time for the UE returns back to a normal service, this will give an end user bad experience on the provided service.

For reselecting UP with the same IP address, it is 1+1 redundancy which may result in big cost.

It is a problem that PGW-U and UPF can't work properly due to path or node failed, PGW-U/UPF redundancy is very important to the operator providing high availability service in the network.

To overcome or mitigate at least one of above mentioned problems or other problems or provide a useful solution, the embodiments of the present disclosure propose a solution. Some embodiments of the disclosure can support UP function such as PGW-U or UPF anchor change with UE IP address preserved upon a path such as Sxb or N4 failure by setting a higher routing priority of the UE's IP address in the new PGW-U or UPF anchor than the routing priority of the UE's IP address in old or failed UP function.

Figure 3:
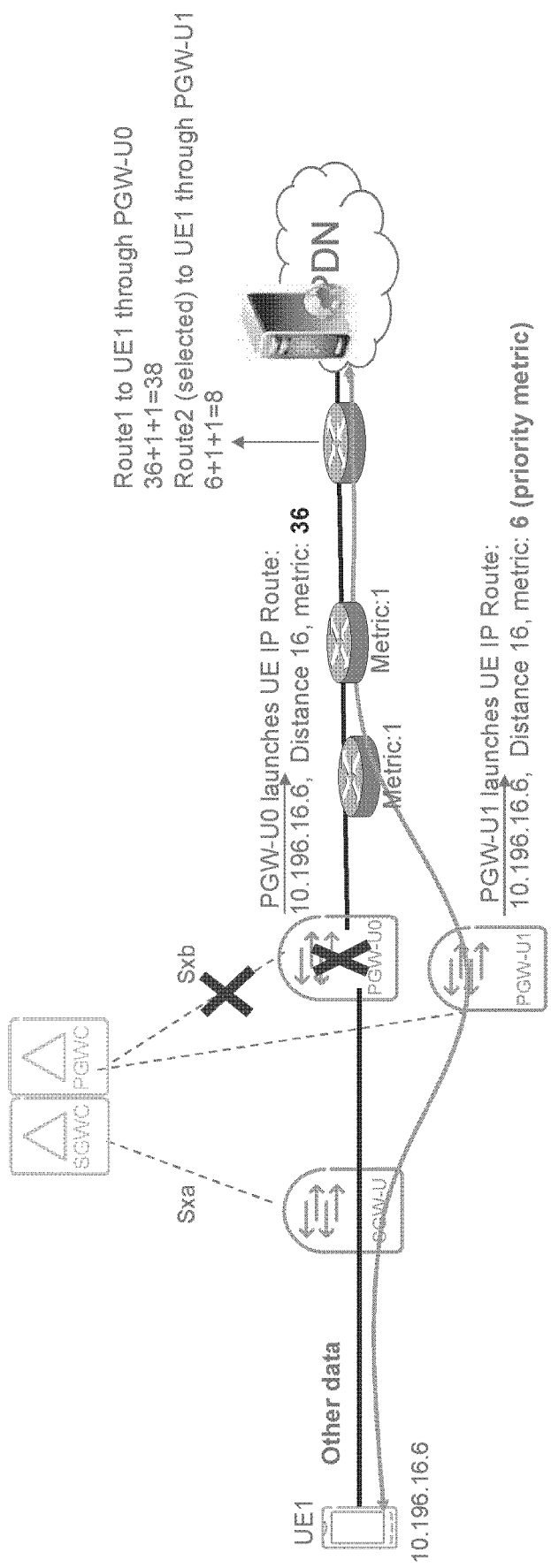
FIG. 3 schematically shows an example of UP such as PGW-U reselection according to an embodiment of the disclosure.

FIG. 3 schematically shows an example of UP such as PGW-U reselection according to an embodiment of the disclosure.

As shown in FIG. 3, when PGW-C detects that Sxb path failure for UP0, PGW-C re-selects UP1 for one or more affected PDN connections, PGW-C can select different UP for one or more affected PDN connections by following UP selection criteria.

After UP1 is re-selected, PGW-C sends PFCP Session Establishment Request with the UE IP address and priority metric. In an embodiment, the priority metric means lower cost for this UE IP route.

In an embodiment, there may be two ways to do the UP change, one is proactive and the other one is reactive. For proactive way, PGW-C starts the procedure in a planned way. And in this case, PGW-C can provision the routing information of a whole slice so as to aggregate the routing in UP. For reactive way, the UP change may be triggered by a signaling where UP interaction is needed.

When UP1 receives Packet Forwarding Control Protocol (PFCP) Session Establishment Request, UP1 immediately advertises the new IP host route with lower metric to one or more data networks. The instant advertising to the one or more networks may be very quick, which can quickly recover the service for the UE.

After receiving PFCP Session Establishment Response, PGW-C/SMF sends Update Bearer Request with new S5S8-U F-TEID (Fully Qualified Tunnel Endpoint Identifier) of UP1 to inform SGW-C, this indicated that old S5S8-U F-TEID of the UP0 shall not be used; since the Update Bearer Request is only for the user plane information of the additional PGW-U, the message will not be further sent to SGSN(Serving General Packet Radio Service (GPRS) Support Node (SGSN))/MME. The uplink UE payload will go through the UP1 since SGW-C is informed with the S5/S8-U F-TEID of UP1.

The UP0 may have failed or still work (due to only path failed), but the downlink UE payload will go through UP1 since it has lower metric than the UP0; and the uplink UE payload will transfer through UP1 since the stored S5/S8-U F-TEID is UP1 instead of the UP0.

When the PGW-C detects Sxb path available for the UP0, PGW-C will delete the PFCP session in the UP0; When the UE IP is released in UP1, PGW-C can allocate this IP address and the corresponding UP0. Another alternative is: in reactive way, the PGW-C can move the PFCP session back to the UP0.

In an embodiment, PGW-C can select different UPs for all the affected UEs in the failed Sxb path, which can be evenly distributed the load.

Figure 4:
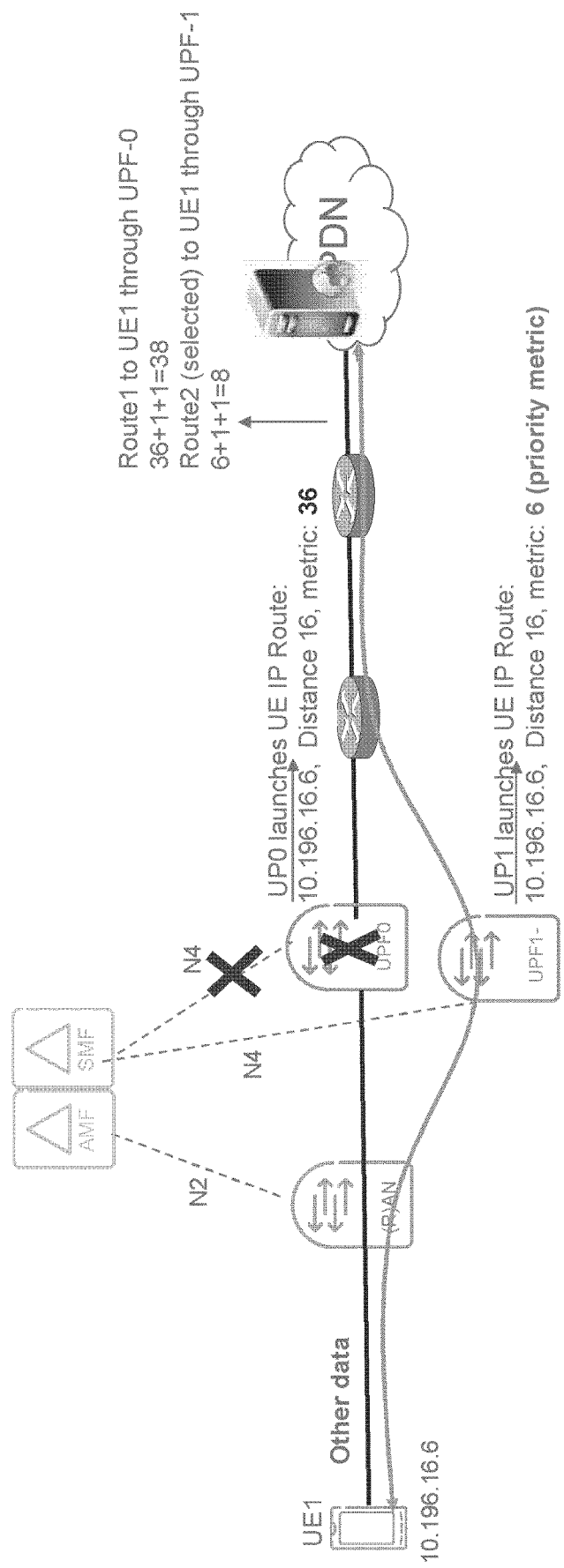
FIG. 4 schematically shows an example of UP such as UPF reselection according to an embodiment of the disclosure.

FIG. 4 schematically shows an example of UP such as UPF reselection according to an embodiment of the disclosure. In this embodiment, SMF can perform UPF re-selection when SMF detects the N4 path failure or UPF0 is failed. The solution of FIG. 4 is similar to that of FIG. 3, therefore the detailed description of FIG. 4 is omitted here for brevity.

Figure 5:
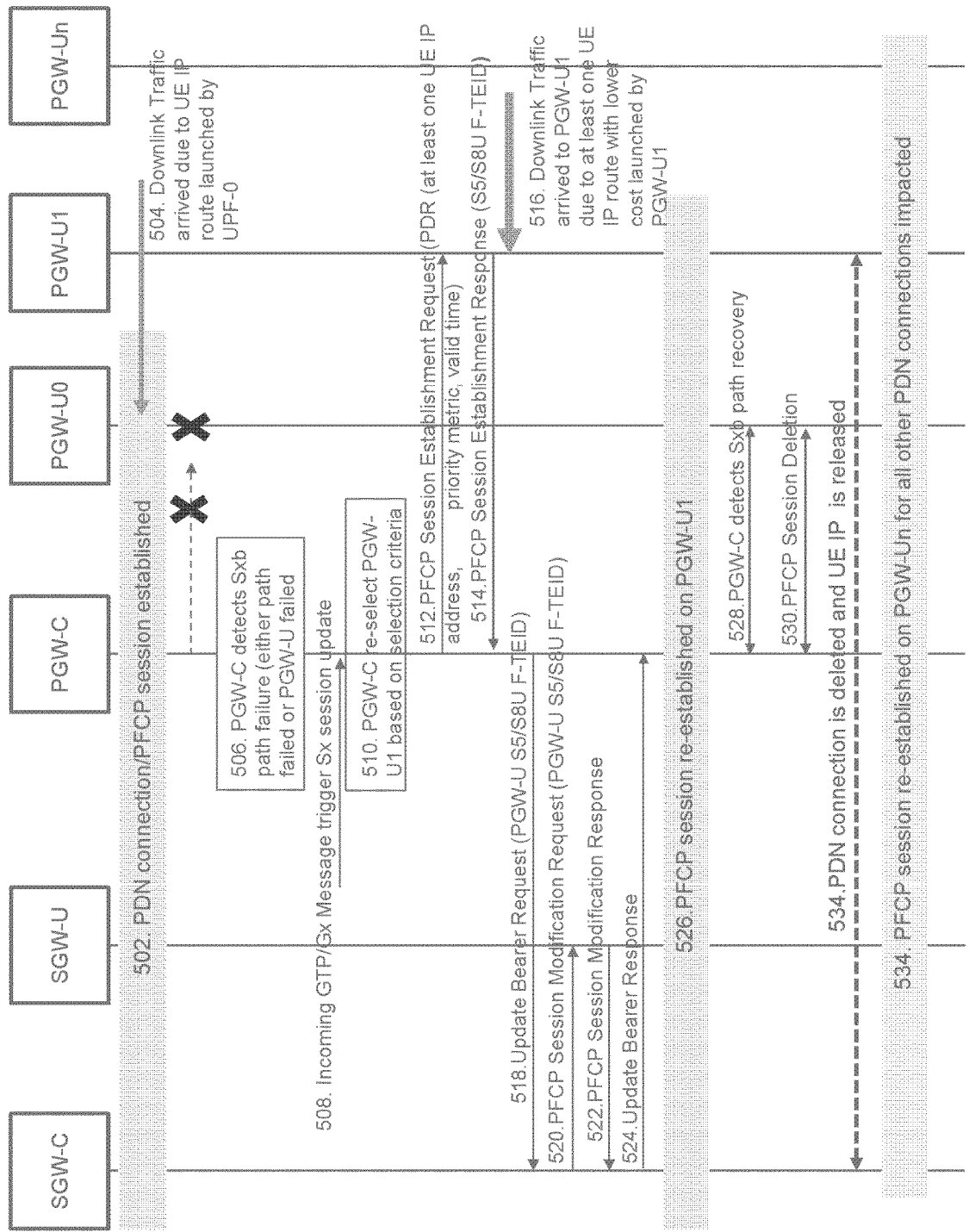
FIG. 5 shows a flowchart of a method according to an embodiment of the present disclosure.

FIG. 5 shows a flowchart of a method according to an embodiment of the present disclosure. This method can be implemented in the 4G communication system such as LTE, 2G/3G communication system with S4-SGSN access such as GSM/WCDMA, and other suitable communication system.

At step 502, there are many PFCP sessions corresponding to PDN connections are established between PGW-C and PGW-U0.

At step 504, the UE payload traffic is transferred properly in PGW-U0 The IP routes of allocated UE IP addresses are launched to one or more data networks by PGW-U0, the Downlink traffic from the one or more data networks is routed to PGW-U0 through the launched UE IP routes; the Uplink traffic is sent by a tunnel such as GPRS Tunnelling Protocol (GTP) User Plane (GTP-U) tunnel between SGW-U and PGW-U0.

At step 506, PGW-C detects Sxb path failure (either path failed or PGW-U failed).

In addition, if PGW-U has also detected the Sxb path failure, PGW-U deletes the PFCP sessions and the routing information for the UE IP addresses.

In an embodiment, there are two ways to do the PGW-U change, one is proactive and the other one is reactive. For the proactive way, PGW-C starts the procedure in a planned way. In this case, PGW-C can provision the routing information of a whole IP address range so as to aggregate the routing in UP. Since the PFCP sessions are huge for the impacted second NF such as PGW-U or UPF, the proactive way does the PGW-U or UPF change in a planned way, e.g sending the message to the new selected UP in a time window instead of in one time (which might introduces signaling storm due to huge PFCP sessions). The reactive way just triggers the PGW-U or UPF change when there is incoming external messages, then the PGW-C send the message to the new selected UP.

At step 508, for the reactive way, PGW-C receives a signaling from another NF such as SGW-C or PCRF for a UE's PDN connection where PGW-U interaction is needed. This signaling may trigger the PGW-U change.

At step 510, PGW-C reselects another available PGW-U1 by using PGW-U selection criteria for example as defined by an operator, a device manufacture or a user.

At step 512, PGW-C sends PFCP Session Establishment Request Message with SGW-U S5/S8 F-TEID, at least one UE IP address or IP address range with priority metric, valid time to PGW-U1. Valid time is applied for the priority metric, when the valid time expires, the priority metric will be invalid and a normal metric shall be applied. The normal metric may have a lower priority than the priority metric sent to the PGW-U1. This assures that PGW-U1 using the normal priority can be applied the solution of embodiments of the disclosure when the same problem such as path failure between PGW-C and PGW-U1 or PGW-U1 failure happened.

At step 514, PGW-U1 responses PFCP Session Establishment Response Message with the allocated PGW-U1 S5/S8 F-TEID.

At the same time, PGW-U1 also immediately launches the at least one UE IP address or IP address range and priority metric to the one or more data networks, the one or more data networks knows that PGW-U1 has the shortest path or lower cost towards at least one UE IP address or IP address range, even PGW-U0 has the same at least one UE IP address or IP address range route when PGW-U0 is still available and only path is failed for this detected Sxb path failure.

At step 516, downlink traffic arrived to PGW-U1 due to the UE IP route with a lower cost launched by PGW-U1.

At step 518, PGW-C also sends Update Bearer Request with PGW-U1 S5/S8U F-TEID. Since the Update Bearer Request is only for the user plane information of the additional PGW-U, the message will not be further sent to SGSN/MME.

At step 520, SGW-C sends PFCP Session Modification Request with PGW-U1 S5/S8U F-TEID to SGW-U to update the GTP-U channel information.

At step 522, SGW-U sends success PFCP Session Modification Response to SGW-U.

At step 524, SGW-C sends success Update Bearer Response to PGW-C.

At step 526, the uplink traffic for the at least one UE will go through SGW-U and PGW-U1, and the downlink traffic for the at least one UE will go through PGW-U1 instead of PGW-U0, since PGW-U1 has a higher route priority for the at least one UE IP address or IP address range such as the shortest path towards the at least one UE IP address or IP address range.

At step 528, PGW-C detects that the Sxb path available for example by a heartbeat procedure.

At step 530, PGW-C sends PFCP Session Deletion to cleanup the at least one UE's PFCP session in PGW-U0.

At step 532, the PDN connection of the at least one UE is deleted naturally and the at least one UE's IP address is released, the corresponding at least one UE's IP address route shall also be deleted in PGW-U1.

At step 534, the above steps are applied for PFCP session re-established on PGW-Un for all other PDN connections impacted by Sxb path failure towards PGW-U0 or PGW-U0 failure.

Figure 6:
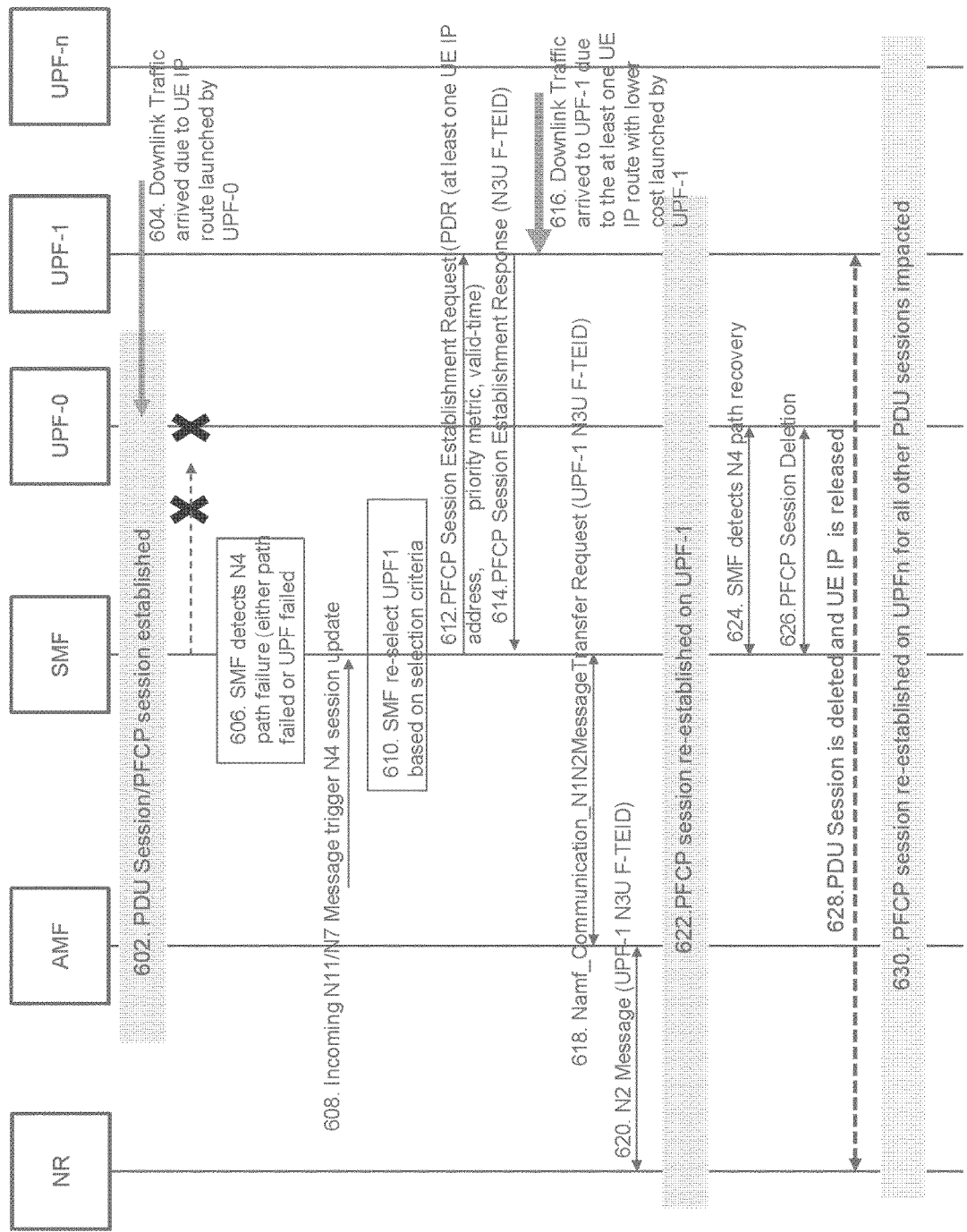
FIG. 6 shows a flowchart of a method according to another embodiment of the present disclosure.

FIG. 6 shows a flowchart of a method according to another embodiment of the present disclosure. This method can be implemented in the 5G communication system such as NR.

At step 602, there are many PFCP sessions corresponding to PDU sessions are established between SMF and UPF-0.

At step 604, the UE payload traffic is transferred properly in UPF-0. The IP routes of allocated UE IP addresses are launched to one or more data networks by UPF-0. The downlink traffic from the one or more data networks is routed to UPF-0 through the launched UE IP routes, and the uplink traffic is sent by a tunnel between AN (access network) and UPF-0.

At step 606, SMF detects N4 path failure towards UPF-0 (either path failed or UPF-0 failed). In addition, if UPF-0 has also detected the N4 path failure, SMF deletes the PFCP sessions and the routing information for the UE IP addresses.

In an embodiment, there are two ways to do the UPF change, one is proactive and one is reactive. For proactive way, SMF starts the procedure in a planned way. And in this case, SMF can provision the routing information of an IP address range so as to aggregate the routing in UP.

At step 608, for reactive way, SMF receiving a signaling from AMF or PCF for at least one UE PDU session, the signaling indicates that UPF interaction is needed. For example, the signaling may comprise an N11/N7 message which will trigger N4 session update At step 610, SMF reselects another available UPF-1 by using the UP selection criteria for example as defined by an operator, a device manufacture or a user.

At step 612, SMF sends PFCP Session Establishment Request Message with AN N3 F-TEID, UE1 IP address with priority metric, valid time to UPF-1. The valid time is applied for the priority metric. When the valid time expires, the priority metric will be invalid and a normal metric shall be applied. The normal metric may have a lower priority than the priority metric sent to the UPF-1. This assures that UPF-1 using the normal priority can be applied the solution of embodiments of the disclosure when the same problem such as path failure between SMF and UPF-1 or UPF-1 failure happened.

At step 614, UPF-1 responses PFCP Session Establishment Response Message with the allocated UPF-1 N3 F-TIED.

At the same time, UPF-1 also immediately launches the at least one UE IP address or IP address range and priority metric to the one or more data networks, the one or more data networks knows that UPF1 has the shortest path or lower cost towards the at least one UE IP address or IP address range, even UPF-0 has the same at least one UE IP address or IP address range route when UPF-0 is still available and only path is failed for this detected N4 path failure.

At step 616, downlink traffic arrived to UPF-1 due to the at least one UE IP route with a lower cost launched by UPF-1.

At step 618, SMF also sends Namf_Communication_N1N2MessageTransfer with UPF-1 N3 F-TEID to AMF and get a response from AMF.

At step 620, AMF sends an N2 Request including UPF-1 N3 F-TEID received from the SMF to the (R)AN. The (R)AN acknowledges to the AMF with an N2 Response.

At step 622, the uplink traffic for the at least one UE will go through AN and UPF-1, and the downlink traffic for the at least one UE will go through UPF-1 instead of UPF-0, since UPF-1 has a higher route priority for the at least one UE IP address or IP address range such as the shortest path towards the at least one UE IP address or IP address range.

At step 624, SMF detects that the N4 path available for example by Heartbeat procedure;

At step 626, SMF sends PFCP Session Deletion to cleanup the at least one UE's PFCP session in UPF-0.

At step 628, a PDU session for a UE is deleted naturally and the UE's IP address is released, the corresponding UE's IP address route shall also be deleted in UPF-1.

At step 630, the above steps are applied for PFCP session re-established on UPF-n for all other PDU sessions impacted by N4 path failure towards UPF-0 or UPF-0 failure.

Figure 7:
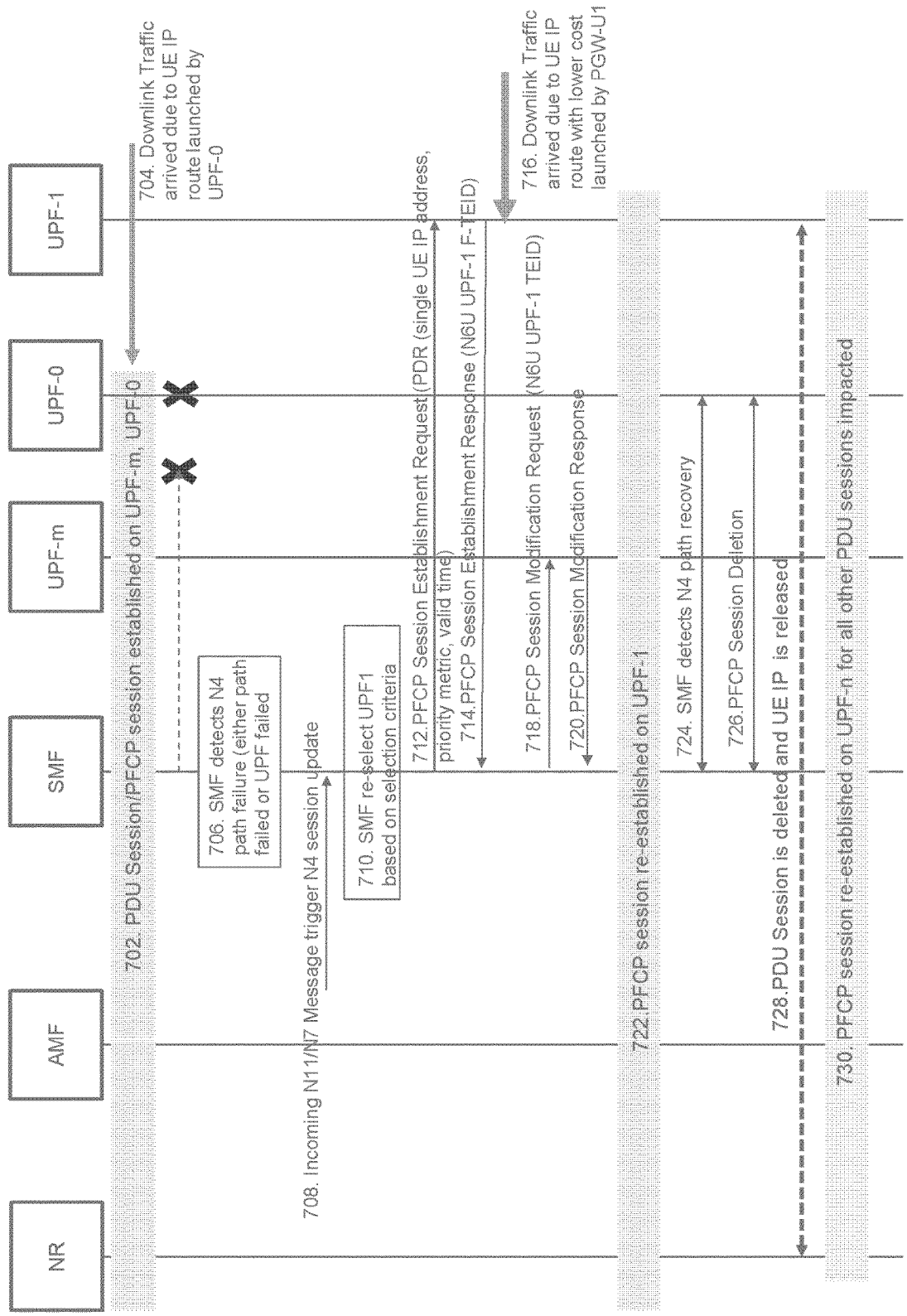
FIG. 7 shows a flowchart of a method according to another embodiment of the present disclosure.

FIG. 7 shows a flowchart of a method according to another embodiment of the present disclosure. This method can be implemented in the 5G communication system such as NR.

At step 702, there are many PFCP sessions corresponding to PDU sessions are established on UPF-m and UPF-0.

At step 704, the UE payload traffic is transferred properly in UPF-0. The IP routes of allocated UE IP addresses are launched to one or more data networks by UPF-0. The downlink traffic from the one or more data networks is routed to UPF-0 through the launched UE IP routes, and the uplink traffic is sent by a tunnel between AN (access network) and UPF-0.

At step 706, SMF detects N4 path failure towards UPF-0 (either path failed or UPF-0 failed). In addition, if UPF-0 has also detected the N4 path failure, SMF deletes the PFCP sessions and the routing information for the UE IP addresses.

In an embodiment, there are two ways to do the UPF change, one is proactive and one is reactive. For proactive way, SMF starts the procedure in a planned way. And in this case, SMF can provision the routing information of an IP address range so as to aggregate the routing in UP.

At step 708, for reactive way, SMF receiving a signaling from AMF or PCF for at least one UE PDU session, the signaling indicates that UPF interaction is needed. For example, the signaling may comprise an N11/N7 message which will trigger N4 session update.

At step 710, SMF reselects another available UPF-1 by using the UP selection criteria for example as defined by an operator, a device manufacture or a user.

At step 712, SMF sends PFCP Session Establishment Request with a tunnel identifier of UPF-m, at least one UE's IP address with priority metric, valid time to UPF-1. The valid time is applied for the priority metric. When the valid time expires, the priority metric will be invalid and a normal metric shall be applied. The normal metric may have a lower priority than the priority metric sent to the UPF-1. This assures that UPF-1 using the normal priority can be applied the solution of embodiments of the disclosure when the same problem such as path failure between SMF and UPF-1 or UPF-1 failure happened.

At step 714, UPF-1 responses PFCP Session Establishment Response Message with the allocated UPF-1

At the same time, UPF-1 also immediately launches the at least one UE IP address or IP address range and priority metric to the one or more data networks, the one or more data networks knows that UPF1 has the shortest path or lower cost towards the at least one UE IP address or IP address range, even UPF-0 has the same at least one UE IP address or IP address range route when UPF-0 is still available and only path is failed for this detected N4 path failure.

At step 716, downlink traffic arrived to UPF-1 due to the at least one UE IP route with a lower cost launched by UPF-1.

At step 718, SMF sends PFCP Session Modification Request including UPF-1 TED to UPF-m.

At step 720, SMF receive a PFCP Session Modification Response from UPF-m.

At step 722, the PFCP session is re-established on UPF-1

At step 724, SMF detects that the N4 path available for example by a heartbeat procedure;

At step 726, SMF sends PFCP Session Deletion to clean up the at least one UE's PFCP session in UPF-0.

At step 728, a PDU session for a UE is deleted naturally and the UE's IP address is released, the corresponding UE's IP address route shall also be deleted in UPF-1.

At step 730, the above steps are applied for PFCP session re-established on UPF-n for all other PDU sessions impacted by N4 path failure towards UPF-0 or UPF-0 failure.

Figure 8:
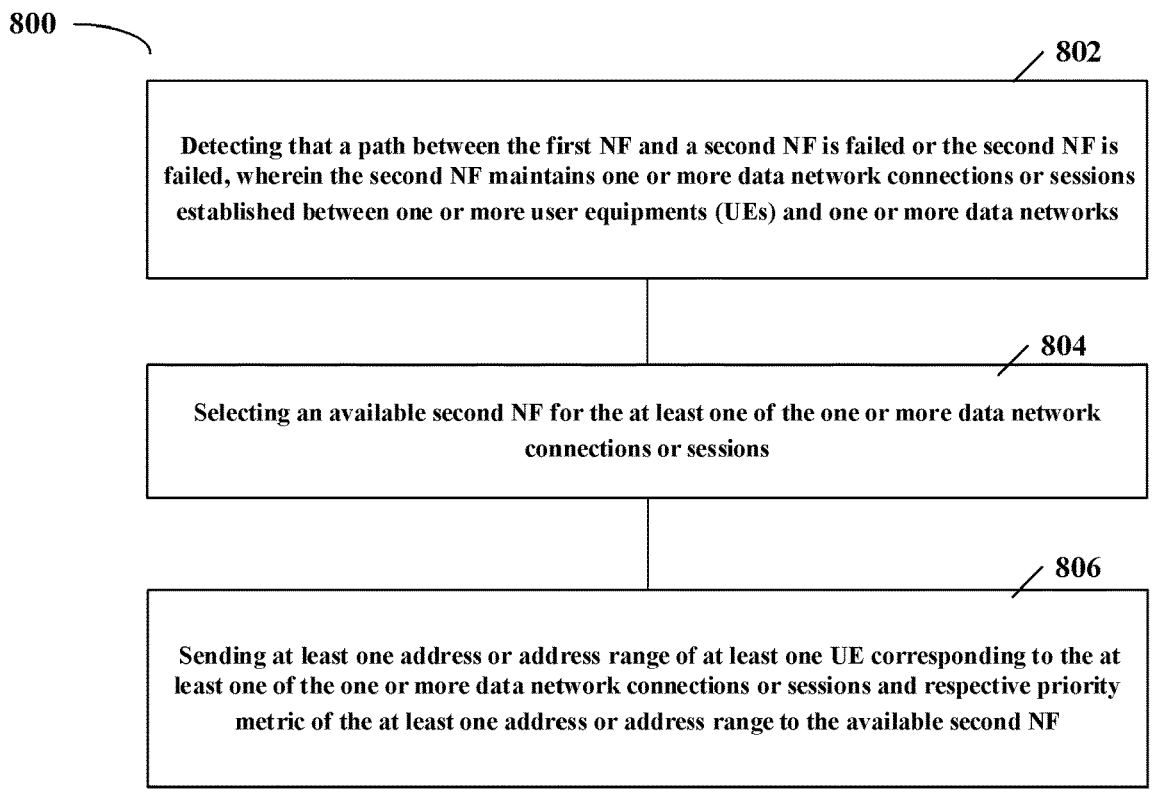
FIG. 8 shows a flowchart of a method according to another embodiment of the present disclosure.

FIG. 8 shows a flowchart of a method 800 according to another embodiment of the present disclosure, which may be performed by an apparatus implemented in a first NF or communicatively coupled to the first NF such as PGW-C or SMF. As such, the apparatus may provide means for accomplishing various parts of the method 800 as well as means for accomplishing other processes in conjunction with other components.

At block 802, the first NF may detect that a path between the first NF and a second NF is failed or the second NF is failed. The second NF may be a user plane function such as PGW-U or UPF. The second NF may maintain one or more data network connections or sessions established between one or more UEs and one or more data networks. Moreover one or more sessions corresponding to one or more data network connections or sessions have been established between the first NF and a second NF. The first NF may implement the control plane function while the second may implement the user plane function.

The first NF may detect that a path between the first NF and a second NF is failed or the second NF is failed in various ways. For example, the first NF may detect that a path between the first NF and a second NF is failed or the second NF is failed by using a heartbeat procedure performed between the first NF and the second NF. The first NF may detect that a path between the first NF and a second NF is failed or the second NF is failed when the first NF can not receive a response or a periodical message or report from the second NF.

At block 804, the first NF may select an available second NF for the at least one of the one or more data network connections or sessions. The first NF may select an available second NF based on predefined selection criteria. For example, the predefined selection criteria may comprise at least one of close to UE, access point name, data network name, UE's functionalities, features and capabilities, UE usage type, quality of service (QOS) requirement of UE, etc. In addition the first NF may select an available second NF for one data network connections or sessions or a group of data network connections or sessions.

At block 806, the first NF may send at least one address or address range of at least one UE corresponding to the at least one of the one or more data network connections or sessions and respective priority metric of the at least one address or address range to the available second NF. The address or address range may take any suitable forms, for example IP address such as IPv4 or IPv6 address. The priority metric may take any suitable forms only if it can enable the one or more data network to route and/or forward traffic for the at least one UE to the available second NF instead of the second NF.

In an embodiment, the at least one address or address range and the respective priority metric may be notified (for example, broadcasted) to the one or more data networks by the available second NF to enable the one or more data networks to route and/or forward traffic for the at least one UE to the available second NF instead of the second NF.

In an embodiment, at least one of the respective priority metric is associated with a valid time. When the valid time expires, a predefined priority metric may be applied to the at least one of the at least one address or address range. In an embodiment, the predefined priority metric has a lower priority than the respective priority metric. For example, the predefined priority metric may be a normal priority metric which may be used by the second NF for the majority of time while the valid time may be used by the second NF in a short time.

In an embodiment, the blocks 804 and 806 may be performed in a planned way or in response to receiving a signaling as described with reference to FIGS. 5-7.

Figure 9:
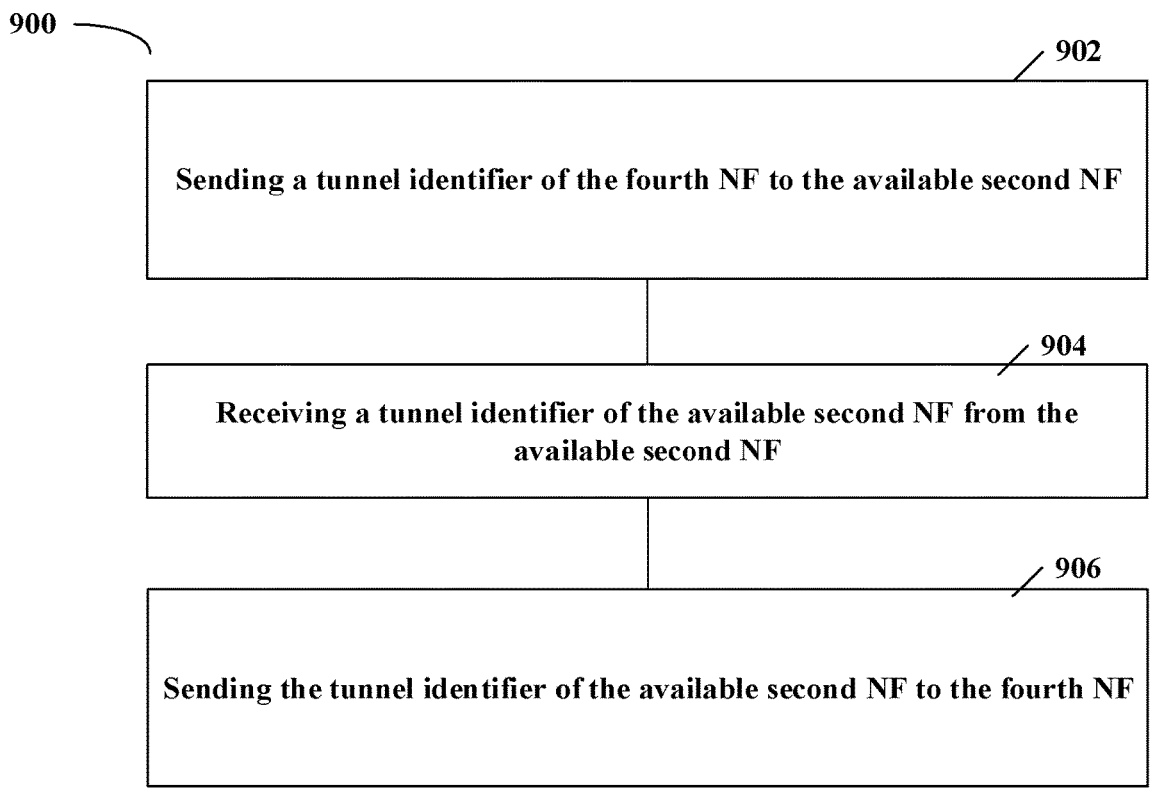
FIG. 9 shows a flowchart of a method according to another embodiment of the present disclosure.

FIG. 9 shows a flowchart of a method 900 according to another embodiment of the present disclosure, which may be performed by an apparatus implemented in a first NF or communicatively coupled to the first NF such as PGW-C or SMF. As such, the apparatus may provide means for accomplishing various parts of the method 900 as well as means for accomplishing other processes in conjunction with other components. In this embodiment, the one or more data network connections or sessions pass through a tunnel between the second NF and a fourth NF. The fourth NF may another user plane function such as SGW-U or UPF.

At block 902, the first NF may send a tunnel identifier of the fourth NF to the available second NF. For example, the first NF may obtain the tunnel identifier of the fourth NF during the one or more data network connections or sessions establishment. The tunnel identifier of the fourth NF, the at least one address or address range of at least one UE and respective priority metric of the at least one address or address range may be sent in the same message to the available second NF.

At block 904, the first NF may receive a tunnel identifier of the available second NF from the available second NF.

At block 906, the first NF may send the tunnel identifier of the available second NF to the fourth NF.

In an embodiment, the first NF may comprise SMF, the second NF may comprise UPF, and the fourth NF may comprise UPF.

In an embodiment, the first NF may send the tunnel identifier of the available second NF to a third NF which will send the tunnel identifier of the available second NF to the fourth NF. In this embodiment, the first NF may comprise a packet data network gateway control plane (PGW-C) or Session Management Function (SMF), the second NF may comprise a packet data network gateway user plane (PGW-U) or User Plane Function (UPF), the third NF may comprise a control plane of a serving gateway (SGW-C) or Access and Mobility Management Function (AMF), and the fourth NF may comprise a user plane of a serving gateway (SGW-U) or (Radio) Access Network ((R)AN).

Figure 10:
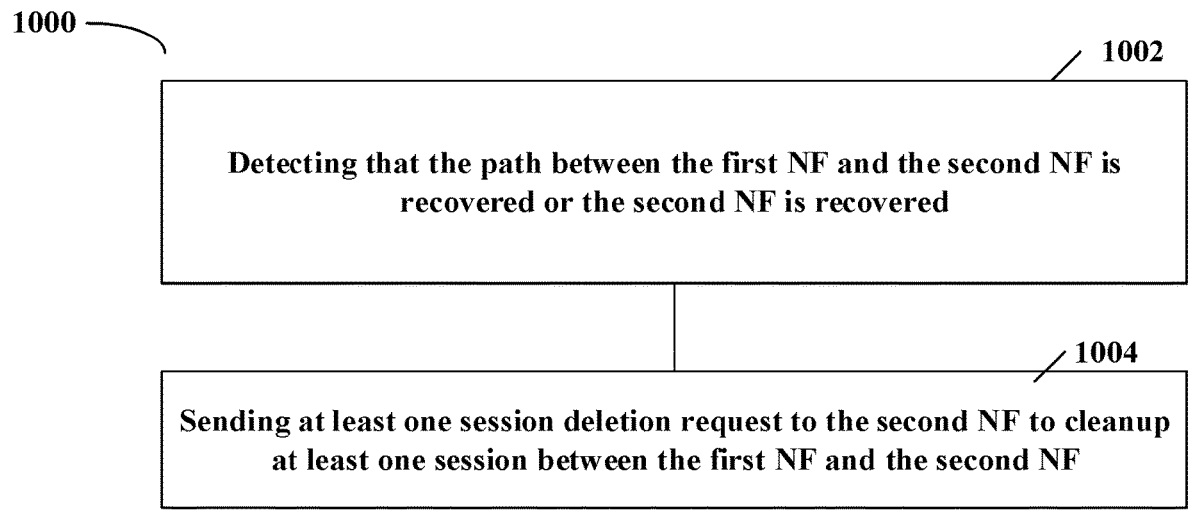
FIG. 10 shows a flowchart of a method according to another embodiment of the present disclosure.

FIG. 10 shows a flowchart of a method 1000 according to another embodiment of the present disclosure, which may be performed by an apparatus implemented in a first NF or communicatively coupled to the first NF such as PGW-C or SMF. As such, the apparatus may provide means for accomplishing various parts of the method 1000 as well as means for accomplishing other processes in conjunction with other components.

At block 1002, the first NF may detect that the path between the first NF and the second NF is recovered or the second NF is recovered. For example, the first NF may receive a message from the second NF or be notified that the path or the second NF has recovered.

At block 1004, the first NF may send at least one session deletion request to the second NF to cleanup at least one session between the first NF and the second NF.

Figure 11:
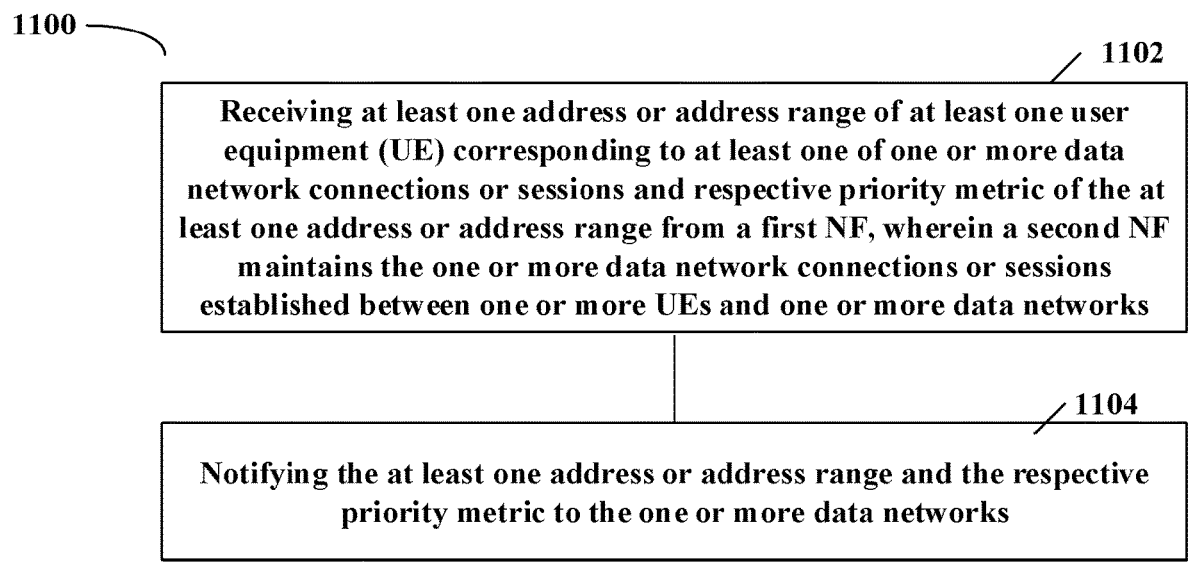
FIG. 11 shows a flowchart of a method according to another embodiment of the present disclosure.

FIG. 11 shows a flowchart of a method 1100 according to another embodiment of the present disclosure, which may be performed by an apparatus implemented in an available second NF or communicatively coupled to the available second NF such as PGW-U or UPF. As such, the apparatus may provide means for accomplishing various parts of the method 1100 as well as means for accomplishing other processes in conjunction with other components. For some parts which have been described in the above embodiments, detailed description thereof is omitted here for brevity.

At block 1102, the available second NF may receive at least one address or address range of at least one user equipment (UE) corresponding to at least one of one or more data network connections or sessions and respective priority metric of the at least one address or address range from a first NF. The second NF may maintain the one or more data network connections or sessions established between one or more UEs and one or more data networks. For example, the first NF may send this information to the available second NF at block 806 of FIG. 8, then the available second NF may receive this information.

At block 1104, the available second NF may notify the at least one address or address range and the respective priority metric to the one or more data networks. For example, the available second NF may immediately broadcast the at least one address or address range and the respective priority metric to the one or more data networks.

In an embodiment, the at least one address or address range and the respective priority metric can enable the one or more data networks to route and/or forward traffic for the at least one UE to the available second NF instead of the second NF.

In an embodiment, at least one of the respective priority metric is associated with a valid time, and when the valid time expires, a predefined priority metric is applied to the at least one of the at least one address or address range.

In an embodiment, the predefined priority metric has a lower priority than the respective priority metric.

Figure 12:
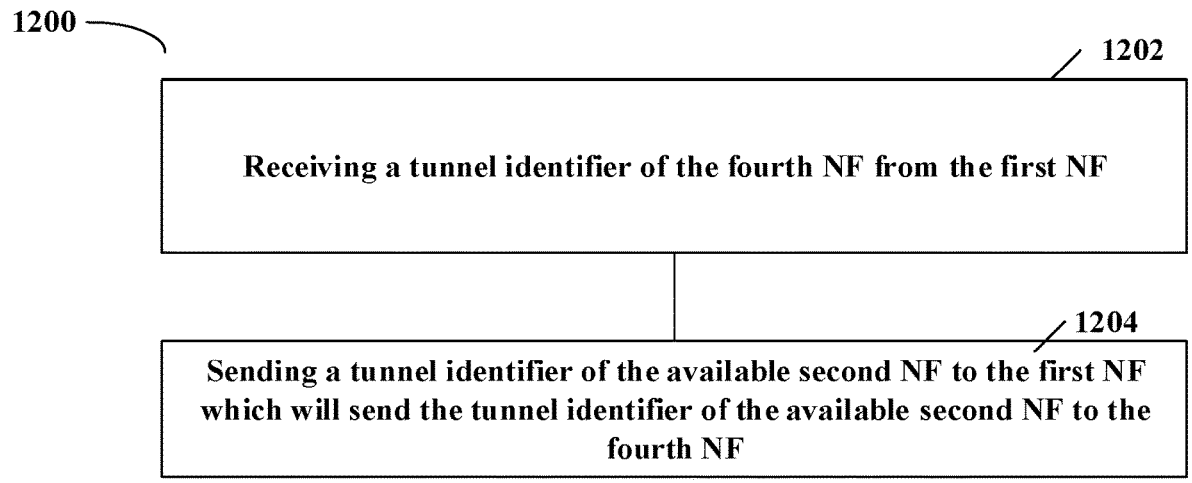
FIG. 12 shows a flowchart of a method according to another embodiment of the present disclosure.

FIG. 12 shows a flowchart of a method 1200 according to another embodiment of the present disclosure, which may be performed by an apparatus implemented in an available second NF or communicatively coupled to the available second NF such as PGW-U or UPF. As such, the apparatus may provide means for accomplishing various parts of the method 1200 as well as means for accomplishing other processes in conjunction with other components. For some parts which have been described in the above embodiments, detailed description thereof is omitted here for brevity. In this embodiment, the one or more data network connections or sessions pass through a tunnel between the second NF and a fourth NF such as SGW-U or (R)AN) or UPF.

At block 1202, the available second NF may receive a tunnel identifier of the fourth NF from the first NF. For example, the first NF may send the tunnel identifier of the fourth NF at block 902 of FIG. 9, and then the available second NF may receive the tunnel identifier of the fourth NF from the first NF. In addition, the tunnel identifier of the fourth NF may be received together with the at least one address or address range of at least one UE and respective priority metric of the at least one address or address range in one message from the first NF.

At block 1204, the available second NF may send a tunnel identifier of the available second NF to the first NF which will send the tunnel identifier of the available second NF to the fourth NF.

In an embodiment, the first NF may comprise Session Management Function (SMF), the second NF may comprise User Plane Function (UPF), and the fourth NF comprises UPF.

In an embodiment, the tunnel identifier of the available second NF is sent by the first NF to a third second NF which will send the tunnel identifier of the available second NF to the fourth NF. In this embodiment, the first NF may comprise a packet data network gateway control plane (PGW-C) or Session Management Function (SMF), the second NF may comprise a packet data network gateway user plane (PGW-U) or User Plane Function (UPF), the third NF may comprise a control plane of a serving gateway (SGW-C) or Access and Mobility Management Function (AMF), and the fourth NF may comprise a user plane of a serving gateway (SGW-U) or (Radio) Access Network ((R)AN).

Figure 13:
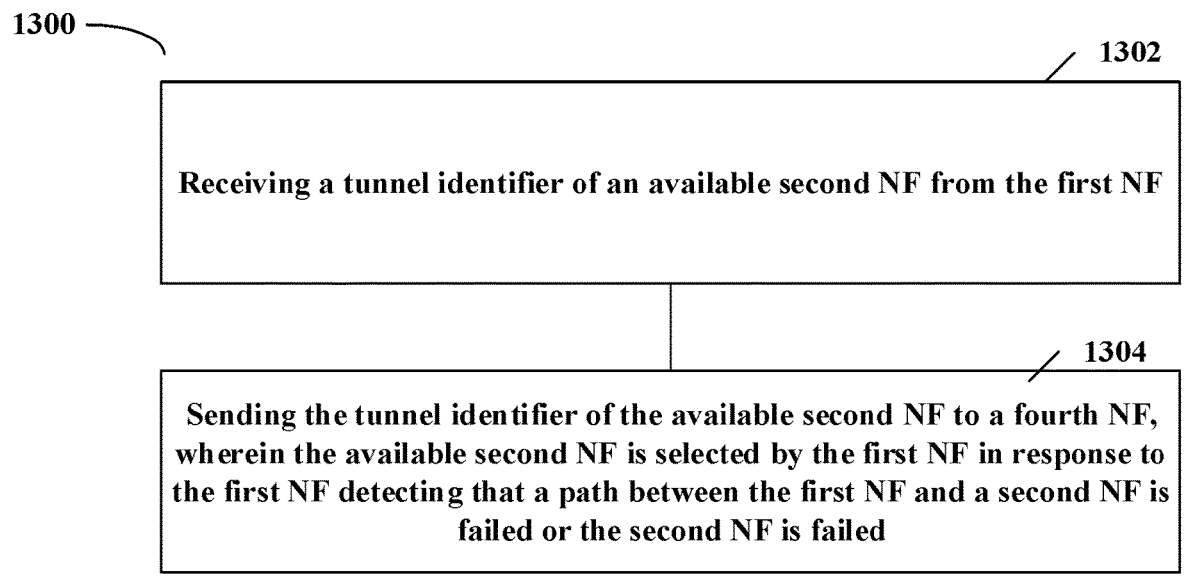
FIG. 13 shows a flowchart of a method according to another embodiment of the present disclosure.

FIG. 13 shows a flowchart of a method 1300 according to another embodiment of the present disclosure, which may be performed by an apparatus implemented in an available second NF or communicatively coupled to a third NF such as SGW-C or AMF. As such, the apparatus may provide means for accomplishing various parts of the method 1300 as well as means for accomplishing other processes in conjunction with other components. For some parts which have been described in the above embodiments, detailed description thereof is omitted here for brevity.

At block 1302, the third NF may receive a tunnel identifier of an available second NF from the first NF. For example, the first NF may send the tunnel identifier of the available second NF to the third NF as described above, and then the third NF may receive a tunnel identifier of an available second NF from the first NF. The available second NF may be selected by the first NF in response to the first NF detecting that a path between the first NF and a second NF is failed or the second NF is failed as described above.

At block 1304, the third NF may send the tunnel identifier of the available second NF to a fourth NF.

In an embodiment, the first NF may comprise a packet data network gateway control plane (PGW-C) or Session Management Function (SMF), the second NF may comprise a packet data network gateway user plane (PGW-U) or User Plane Function (UPF), the third NF may comprise a control plane of a serving gateway (SGW-C) or Access and Mobility Management Function (AMF), and the fourth NF may comprise a user plane of a serving gateway (SGW-U) or (Radio) Access Network ((R)AN).

Figure 14:
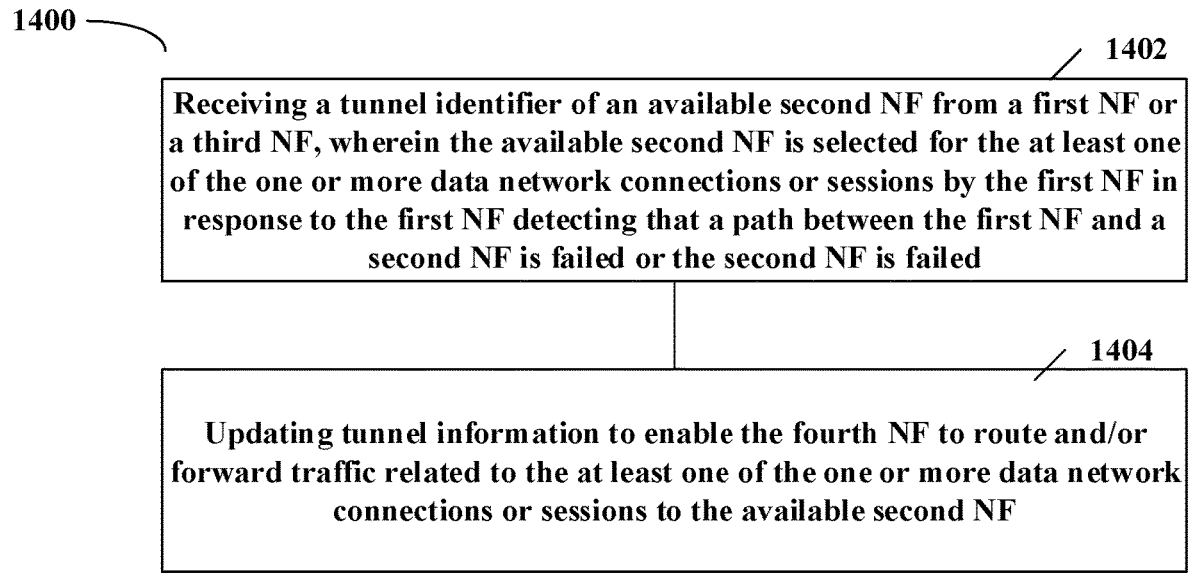
FIG. 14 shows a flowchart of a method according to another embodiment of the present disclosure.

FIG. 14 shows a flowchart of a method 1400 according to another embodiment of the present disclosure, which may be performed by an apparatus implemented in an available second NF or communicatively coupled to a fourth NF such as SGW-U or UPF. As such, the apparatus may provide means for accomplishing various parts of the method 1400 as well as means for accomplishing other processes in conjunction with other components. For some parts which have been described in the above embodiments, detailed description thereof is omitted here for brevity.

At block 1402, the fourth NF may receive a tunnel identifier of an available second NF from a first NF or a third NF. For example, the first NF or the third NF may send the tunnel identifier of an available second NF to the fourth NF as described above, and then the fourth NF may receive a tunnel identifier of an available second NF from a first NF or a third NF. The available second NF may be selected for the at least one of the one or more data network connections or sessions by the first NF in response to the first NF detecting that a path between the first NF and a second NF is failed or the second NF is failed.

At block 1404, the third NF may update tunnel information to enable the fourth NF to route and/or forward traffic related to the at least one of the one or more data network connections or sessions to the available second NF.

In an embodiment, when the tunnel identifier of the available second NF is received from a third NF, the first NF may comprise a packet data network gateway control plane (PGW-C) or Session Management Function (SMF), the second NF may comprise a packet data network gateway user plane (PGW-U) or User Plane Function (UPF), the third NF may comprise a control plane of a serving gateway (SGW-C) or Access and Mobility Management Function (AMF), and the fourth NF may comprise a user plane of a serving gateway (SGW-U) or (Radio) Access Network ((R)AN).

In an embodiment, when the tunnel identifier of the available second NF is received from a first NF, the first NF may comprise Session Management Function (SMF), the second NF may comprise User Plane Function (UPF), and the fourth NF may comprise UPF.

Figure 15A:
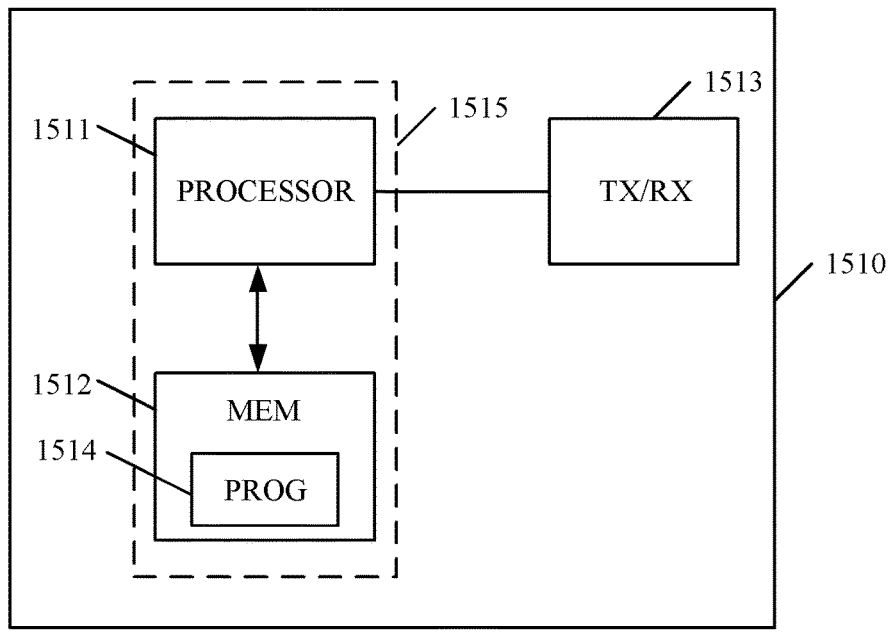
FIG. 15a illustrates simplified block diagrams of an apparatus according to an embodiment of the present disclosure.
Figure 15B:
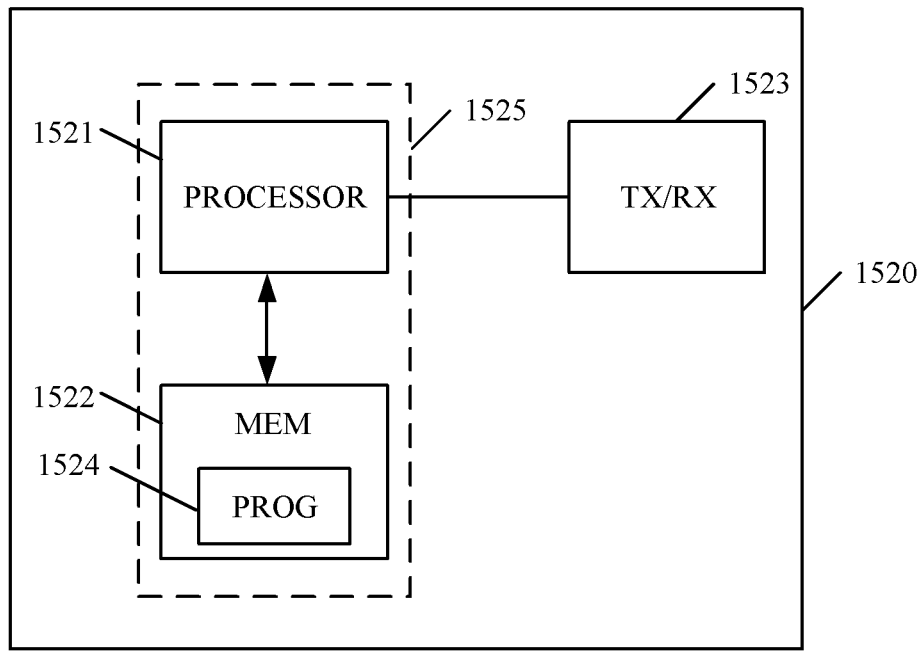
FIG. 15b illustrates simplified block diagrams of an apparatus according to another embodiment of the present disclosure.
Figure 15C:
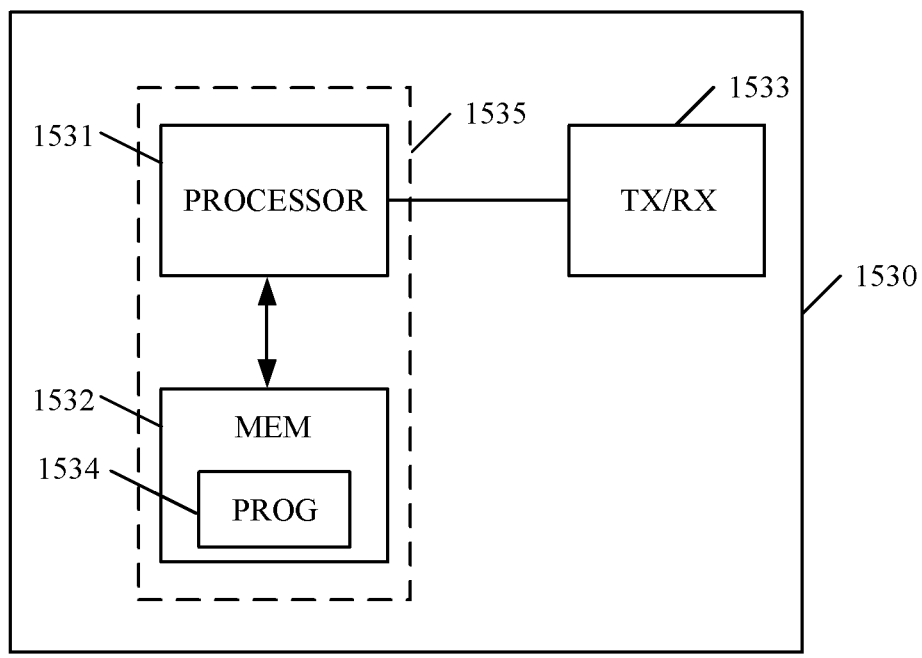
FIG. 15c illustrates simplified block diagrams of an apparatus according to another embodiment of the present disclosure.
Figure 15D:
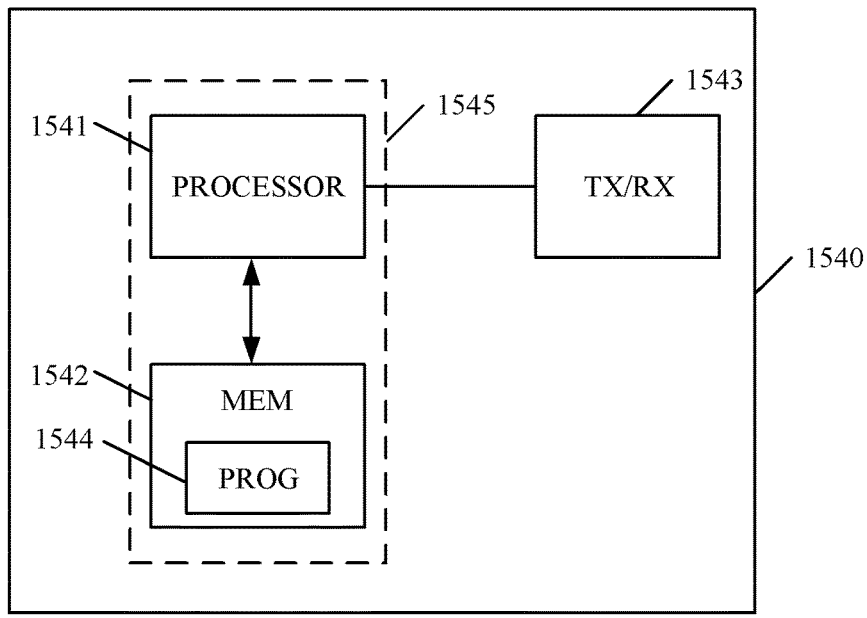
FIG. 15d illustrates simplified block diagrams of an apparatus according to another embodiment of the present disclosure.

FIG. 15a illustrates a simplified block diagram of an apparatus 1510 that may be embodied in/as a first NF according to an embodiment of the present disclosure. FIG. 15b illustrates an apparatus 1520 that may be embodied in/as an available second NF according to an embodiment of the present disclosure. FIG. 15c illustrates an apparatus 1530 that may be embodied in/as a third NF according to an embodiment of the present disclosure. FIG. 15d illustrates an apparatus 1540 that may be embodied in/as a fourth NF according to an embodiment of the present disclosure.

The apparatus 1510 may comprise at least one processor 1511, such as a data processor (DP) and at least one memory (MEM) 1512 coupled to the processor 1511. The apparatus 1510 may further comprise a transmitter TX and receiver RX 1513 coupled to the processor 1511. The MEM 1512 stores a program (PROG) 1514. The PROG 1514 may include instructions that, when executed on the associated processor 1511, enable the apparatus 1510 to operate in accordance with the embodiments of the present disclosure, for example to perform any of the methods related to the first NF. A combination of the at least one processor 1511 and the at least one MEM 1512 may form processing means 1515 adapted to implement various embodiments of the present disclosure.

The apparatus 1520 comprises at least one processor 1521, such as a DP, and at least one MEM 1522 coupled to the processor 1521. The apparatus 1520 may further comprise a transmitter TX and receiver RX 1523 coupled to the processor 1521. The MEM 1522 stores a PROG 1524. The PROG 1524 may include instructions that, when executed on the associated processor 1521, enable the apparatus 1520 to operate in accordance with the embodiments of the present disclosure, for example to perform any of the methods related to the available second NF. A combination of the at least one processor 1521 and the at least one MEM 1522 may form processing means 1525 adapted to implement various embodiments of the present disclosure.

The apparatus 1530 may comprise at least one processor 1531, such as a data processor (DP) and at least one memory (MEM) 1532 coupled to the processor 1531. The apparatus 1530 may further comprise a transmitter TX and receiver RX 1533 coupled to the processor 1531. The MEM 1532 stores a program (PROG) 1534. The PROG 1534 may include instructions that, when executed on the associated processor 1531, enable the apparatus 1530 to operate in accordance with the embodiments of the present disclosure, for example to perform any of the methods the third NF. A combination of the at least one processor 1531 and the at least one MEM 1532 may form processing means 1535 adapted to implement various embodiments of the present disclosure.

The apparatus 1540 may comprise at least one processor 1541, such as a data processor (DP) and at least one memory (MEM) 1542 coupled to the processor 1541. The apparatus 1540 may further comprise a transmitter TX and receiver RX 1543 coupled to the processor 1541. The MEM 1542 stores a program (PROG) 1544. The PROG 1544 may include instructions that, when executed on the associated processor 1541, enable the apparatus 1540 to operate in accordance with the embodiments of the present disclosure, for example to perform any of the methods the third NF. A combination of the at least one processor 1541 and the at least one MEM 1542 may form processing means 1545 adapted to implement various embodiments of the present disclosure.

Various embodiments of the present disclosure may be implemented by computer program executable by one or more of the processors 1511 and 1521, software, firmware, hardware or in a combination thereof.

The MEMs 1512, 1522, 1532 and 1542 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processors 1511, 1521, 1531 and 1541 may be of any type suitable to the local technical environment, and may include one or more of general purpose computers, special purpose computers, microprocessors, digital signal processors DSPs and processors based on multicore processor architecture, as non-limiting examples.

Figure 16:
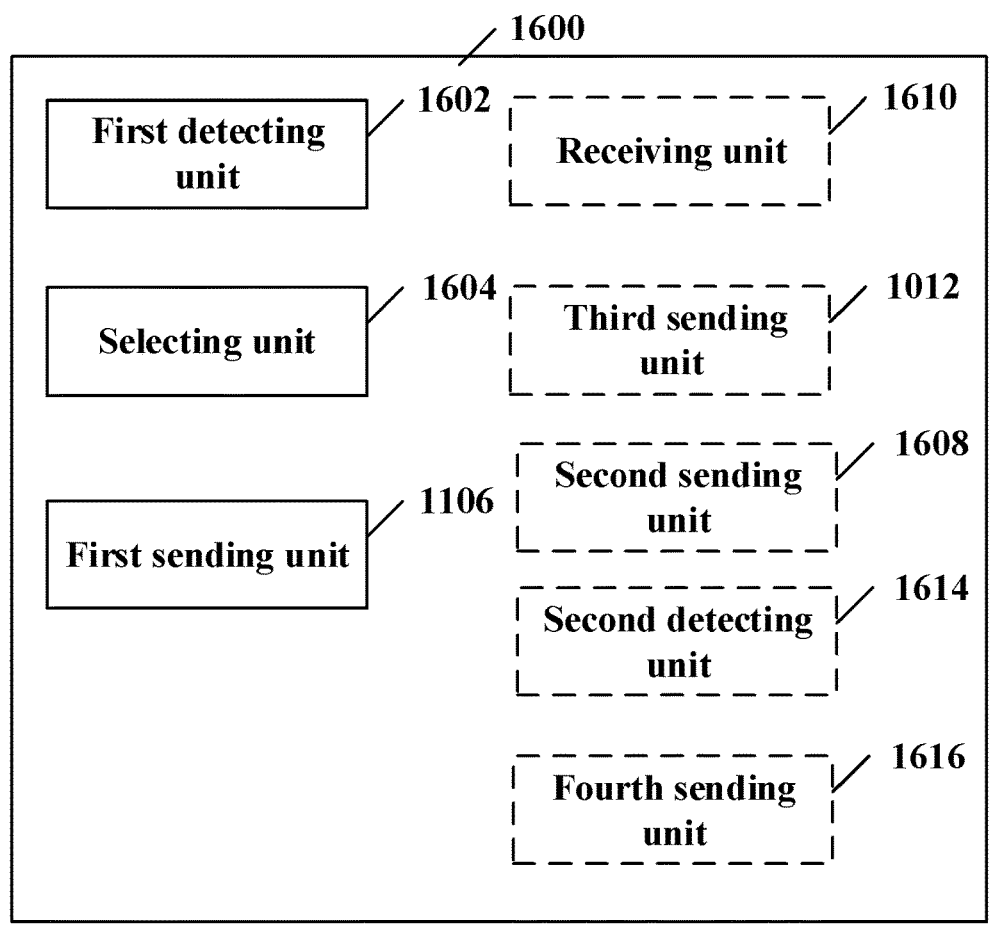
FIG. 16 illustrates simplified block diagrams of an apparatus according to another embodiment of the present disclosure.

Reference is now made to FIG. 16, which illustrates a schematic block diagram of an apparatus 1600 implemented at a first NF. The apparatus 1600 is operable to carry out any of the exemplary methods related to the first NF as described above and possibly any other processes or methods.

As shown in FIG. 16, the apparatus 1600 may comprise: a first detecting unit 1602 configured to detect that a path between the first NF and a second NF is failed or the second NF is failed, wherein the second NF maintains one or more data network connections or sessions established between one or more user equipments (UEs) and one or more data networks; a selecting unit 1604 configured to selecting an available second NF for the at least one of the one or more data network connections or sessions; a first sending unit 1606 configured to send at least one address or address range of at least one UE corresponding to the at least one of the one or more data network connections or sessions and respective priority metric of the at least one address or address range to the available second NF.

In an embodiment, the apparatus 1600 may further comprise a second sending unit (optional) 1608 configured to send a tunnel identifier of the fourth NF to the available second NF; a receiving unit (optional) 1610 configured to receive a tunnel identifier of the available second NF from the available second NF; and a third sending unit (optional) 1612 configured to send the tunnel identifier of the available second NF to the fourth NF.

In an embodiment, the apparatus 1600 may further comprise a second detecting unit (optional) 1614 configured to detect that the path between the first NF and the second NF is recovered or the second NF is recovered; and a fourth sending unit (optional) 1616 configured to send at least one session deletion request to the second NF to cleanup at least one session between the first NF and the second NF.

Figure 17:
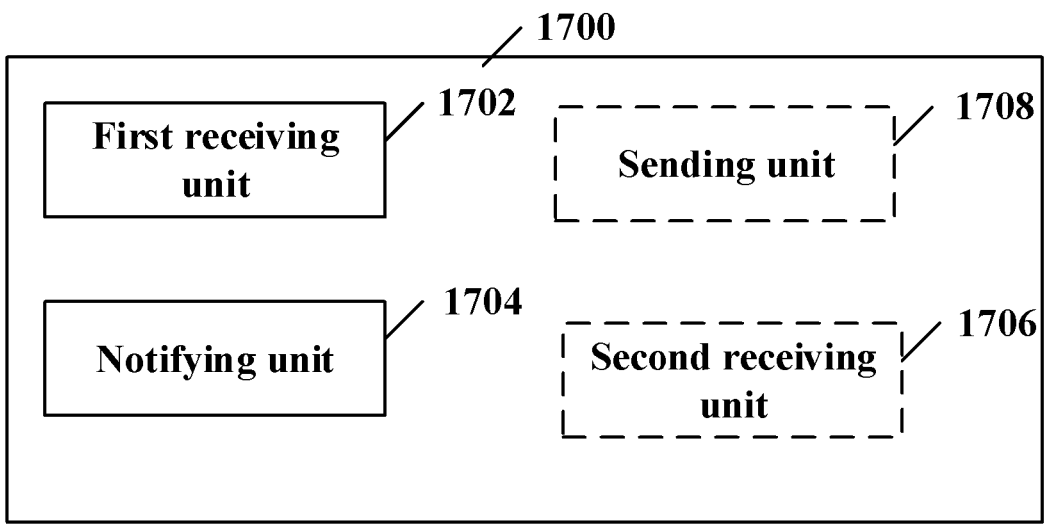
FIG. 17 illustrates simplified block diagrams of an apparatus according to another embodiment of the present disclosure.

Reference is now made to FIG. 17, which illustrates a schematic block diagram of an apparatus 1700 implemented at a second NF. The apparatus 1700 is operable to carry out any of the exemplary methods related to the available second NF as described above and possibly any other processes or methods.

As shown in FIG. 17, the apparatus 1700 may comprise: a first receiving unit 1702 configured to receive at least one address or address range of at least one user equipment (UE) corresponding to at least one of one or more data network connections or sessions and respective priority metric of the at least one address or address range from a first NF, wherein a second NF maintains the one or more data network connections or sessions established between one or more UEs and one or more data networks; and a notifying unit 1704 configured to notify the at least one address or address range and the respective priority metric to the one or more data networks.

In an embodiment, the apparatus 1700 may further comprise a second receiving unit (optional) 1706 configured to receive a tunnel identifier of the fourth NF from the first NF; and a sending unit (optional) 1708 configured to send a tunnel identifier of the available second NF to the first NF which will send the tunnel identifier of the available second NF to the fourth NF.

Figure 18:
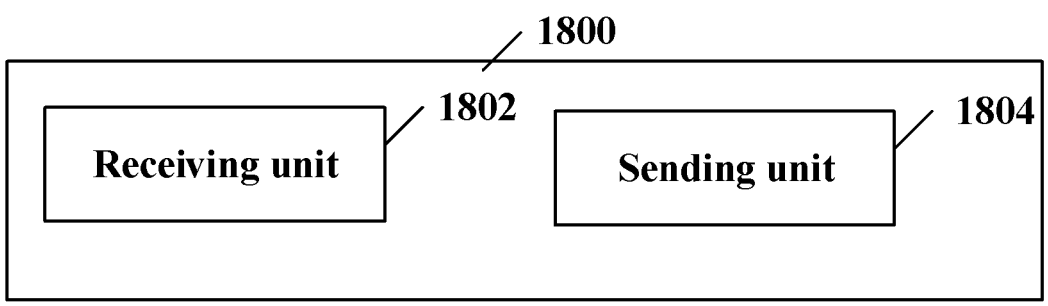
FIG. 18 illustrates simplified block diagrams of an apparatus according to another embodiment of the present disclosure.

Reference is now made to FIG. 18, which illustrates a schematic block diagram of an apparatus 1900 implemented at a third NF. The apparatus 1800 is operable to carry out any of the exemplary methods related to the third NF as described above and possibly any other processes or methods.

As shown in FIG. 18, the apparatus 1800 may comprise: a receiving unit 1802 configured to receive a tunnel identifier of an available second NF from the first NF; and a sending unit 1804 configured to send the tunnel identifier of the available second NF to a fourth NF.

Figure 19:
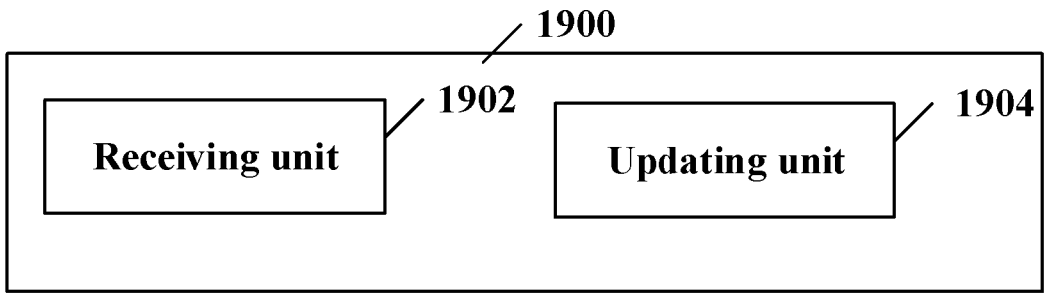
FIG. 19 illustrates simplified block diagrams of an apparatus according to another embodiment of the present disclosure.

Reference is now made to FIG. 19, which illustrates a schematic block diagram of an apparatus 1900 implemented at a fourth NF. The apparatus 1900 is operable to carry out any of the exemplary methods related to the fourth NF as described above and possibly any other processes or methods.

As shown in FIG. 19, the apparatus 1900 may comprise: a receiving unit 1902 configured to receiving a tunnel identifier of an available second NF from a first NF or a third NF, wherein the available second NF is selected for the at least one of the one or more data network connections or sessions by the first NF in response to the first NF detecting that a path between the first NF and a second NF is failed or the second NF is failed; and a updating unit 1904 configured to update tunnel information to enable the fourth NF to route and/or forward traffic related to the at least one of the one or more data network connections or sessions to the available second NF.

According to an aspect of the disclosure it is provided a computer program product being tangibly stored on a computer readable storage medium and including instructions which, when executed on at least one processor, cause the at least one processor to carry out any of the methods related to the first NF as described above.

According to an aspect of the disclosure it is provided a computer program product being tangibly stored on a computer readable storage medium and including instructions which, when executed on at least one processor, cause the at least one processor to carry out any of the methods related to the available second NF as described above.

According to an aspect of the disclosure it is provided a computer program product being tangibly stored on a computer readable storage medium and including instructions which, when executed on at least one processor, cause the at least one processor to carry out any of the methods related to the third NF as described above.

According to an aspect of the disclosure it is provided a computer program product being tangibly stored on a computer readable storage medium and including instructions which, when executed on at least one processor, cause the at least one processor to carry out any of the methods related to the fourth NF as described above.

According to an aspect of the disclosure it is provided a computer readable storage medium including instructions which, when executed on at least one processor, cause the at least one processor to carry out any of the methods related to the first NF as described above.

According to an aspect of the disclosure it is provided a computer readable storage medium including instructions which, when executed on at least one processor, cause the at least one processor to carry out any of the methods related to the available second NF as described above.

According to an aspect of the disclosure it is provided a computer readable storage medium including instructions which, when executed on at least one processor, cause the at least one processor to carry out any of the methods related to the third NF as described above.

According to an aspect of the disclosure it is provided a computer readable storage medium including instructions which, when executed on at least one processor, cause the at least one processor to carry out any of the methods related to the fourth NF as described above.

According to some embodiments of the disclosure, when the first NF such as PGW-C/SMF detects the path such as Sx/N4 failure, the first NF such as PGW-C/SMF will reselect another available second NF such as PGW-U/UPF by providing a higher metric route, without changing UE IP address, without deleting the existing PDN connection/reestablishing new PDN connection.

The embodiments of the present disclosure may provide the following advantages. Some embodiments of the present disclosure can provide a simple and efficient method for the second NF such as PGW-U/UPF reselection when a path such as Sx/N4 failure is detected; Low cost to achieve the UP redundancy. Some embodiments of the present disclosure can save huge signaling on the radio/core network (since the existing solution requires to release the old PDN connection and re-establish the new connection). In some embodiments of the present disclosure, the session and service continuity is kept and give a good experience to the end users. Some embodiments of the present disclosure can provide a user friendly, cost-saving and efficient way to change the second NF such as PGW-U or UPF anchor upon path such as Sxb or N4 failure. In some embodiments of the present disclosure, there is less signaling in the network and less impact on UE's service compared with deleting the PDN connection or PDU session. Some embodiments of the present disclosure can provide much lower cost compared with UP function level 1+1 redundancy.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented at a first network function (NF), comprising:
   detecting that a path between the first NF and a second NF is failed or the second NF is failed, wherein the second NF maintains one or more data network connections or sessions established between one or more user equipments (UEs) and one or more data networks;
   selecting an available second NF for the at least one of the one or more data network connections or sessions;
   sending at least one address or address range of at least one UE corresponding to the at least one of the one or more data network connections or sessions and a respective priority metric of the at least one address or address range to the available second NE; and
   the respective priority metric being associated with a valid time, and responsive to the valid time expiring, applying a predefined priority metric to the at least one address or address range, the respective priority metric having a higher priority than a priority of the predefined priority metric, the higher priority indicating a shorter path toward the at least one address or address range.

2. The method according to claim 1, wherein the steps of selecting and sending are performed in a planned way or in response to receiving a signaling.

3. The method according to claim 1, wherein the at least one address or address range and the respective priority metric are notified to the one or more data networks by the available second NF to enable the one or more data networks at least one of to route and forward traffic for the at least one UE to the available second NF instead of the second NF.

4. The method according to claim 1, wherein the one or more data network connections or sessions pass through a tunnel between the second NF and a fourth NF, the method further comprises:
   sending a tunnel identifier of the fourth NF to the available second NF;
   receiving a tunnel identifier of the available second NF from the available second NF; and
   sending the tunnel identifier of the available second NF to the fourth NF.

5. The method according to claim 4, wherein the first NF comprises a Session Management Function (SMF), the second NF comprises a User Plane Function (UPF), and the fourth NF comprises another UPF.

6. The method according to claim 4, wherein sending the tunnel identifier of the available second NF to the fourth NF comprises:
   sending the tunnel identifier of the available second NF to a third NF, the third NF configured to send the tunnel identifier of the available second NF to the fourth NF.

7. The method according to claim 6, wherein the first NF comprises a packet data network gateway control plane (PGW-C) or a Session Management Function (SMF), the second NF comprises a packet data network gateway user plane (PGW-U) or a User Plane Function (UPF), the third NF comprises a control plane of a serving gateway (SGW-C) or an Access and Mobility Management Function (AMF), and the fourth NF comprises a user plane of a serving gateway (SGW-U) or a (Radio) Access Network ((R)AN).

8. The method according to claim 1, further comprising:
   detecting that the path between the first NF and the second NF is recovered or the second NF is recovered; and
   sending at least one session deletion request to the second NF to cleanup at least one session between the first NF and the second NF.

9. A method implemented at an available second network function (NF), comprising:
   receiving at least one address or address range of at least one user equipment (UE) corresponding to at least one of one or more data network connections or sessions and a respective priority metric of the at least one address or address range from a first NF, wherein the second NF maintains the one or more data network connections or sessions established between one or more UEs and one or more data networks;
   notifying the at least one address or address range and the respective priority metric to the one or more data networks;
   the respective priority metric being associated with a valid time, and
   responsive to the valid time expiring, applying a predefined priority metric to the at least one address or address range, the respective priority metric having a higher priority than a priority of the predefined priority metric, the higher priority indicating a shorter path toward the at least one address or address range.

10. The method according to claim 9, wherein the at least one address or address range and the respective priority metric can enable the one or more data networks at least one of to route and forward traffic for the at least on UE to the available second NF instead of the second NF.

11. The method according to claim 9, wherein the one or more data network connections or sessions pass through a tunnel between the second NF and a fourth NF, the method further comprising
   receiving a tunnel identifier of the fourth NF from the first NF; and
   sending a tunnel identifier of the available second NF to the first NF, the first NF configured to send the tunnel identifier of the available second NF to the fourth NF.

12. The method according to claim 11, wherein the first NF comprises a Session Management Function (SMF), the second NF comprises a User Plane Function (UPF), and the fourth NF comprises a UPF.

13. The method according to claim 11, wherein the tunnel identifier of the available second NF is sent by the first NF to a third second NF which will send the tunnel identifier of the available second NF to the fourth NF.

14. The method according to claim 13, wherein the first NF comprises a packet data network gateway control plane (PGW-C) or a Session Management Function (SMF), the second NF comprises a packet data network gateway user plane (PGW-U) or a User Plane Function (UPF), the third NF comprises a control plane of a serving gateway (SGW-C)

or an Access and Mobility Management Function (AMF), and the fourth NF comprises a user plane of a serving gateway (SGW-U) or a (Radio) Access Network ((R)AN).

15. An apparatus implemented at a first network function (NF), comprising:
 a processor; and
 a memory coupled to the processor, said memory containing instructions executable by said processor, whereby said apparatus is configured to:
  detect that a path between the first NF and a second NF is failed or the second NF is failed, wherein the second NF maintains one or more data network connections or sessions established between one or more user equipments (UEs) and one or more data networks;
  select an available second NF for the at least one of the one or more data network connections or sessions;
  send at least one address or address range of at least one UE corresponding to the at least one of the one or more data network connections or sessions and a respective priority metric of the at least one address or address range to the available second NE;
  the respective priority metric being associated with a valid time, and responsive to the valid time expiring, applying a predefined priority metric to the
 at least one address or address range, the respective priority metric having a higher priority than a priority of the predefined priority metric, the higher priority indicating a shorter path toward the at least one address or address range.

16. An apparatus implemented at an available second network function (NF), comprising:
 a processor; and
 a memory coupled to the processor, said memory containing instructions executable by said processor, whereby said apparatus is configured to:
  receive at least one address or address range of at least one user equipment (UE) corresponding to at least one of one or more data network connections or sessions and a respective priority metric of the at least one address or address range from a first NF, wherein a second NF maintains the one or more data network connections or sessions established between one or more UEs and one or more data networks;
  notify the at least one address or address range and the respective priority metric to the one or more data networks;
 of the respective priority metric being associated with a valid time, and
 responsive to the valid time expiring, applying a predefined priority metric to the
 at least one address or address range, the respective priority metric having a higher priority than a priority of the predefined priority metric, the higher priority indicating a shorter path toward the at least one address or address range.

* * * * *